United States Patent
Hansen et al.

(10) Patent No.: US 12,423,460 B2
(45) Date of Patent: *Sep. 23, 2025

(54) SUBJECT LOGGING

(71) Applicant: Workday, Inc., Pleasanton, CA (US)

(72) Inventors: Katherine Sue Hansen, Clayton, CA (US); Suma Handalagere, San Ramon, CA (US); Sanyukta Inamdar, Berkeley, CA (US); Vamsi Thummala, Pleasanton, CA (US)

(73) Assignee: Workday, Inc., Pleasanton, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/529,127

(22) Filed: Dec. 5, 2023

(65) Prior Publication Data

US 2024/0104237 A1    Mar. 28, 2024

Related U.S. Application Data

(63) Continuation of application No. 17/469,675, filed on Sep. 8, 2021, now Pat. No. 11,886,608.

(51) Int. Cl.
*G06F 21/00* (2013.01)
*G06F 21/62* (2013.01)

(52) U.S. Cl.
CPC .. *G06F 21/6227* (2013.01); *G06F 2221/2101* (2013.01); *G06F 2221/2135* (2013.01)

(58) Field of Classification Search
None
See application file for complete search history.

(56) References Cited

U.S. PATENT DOCUMENTS

7,613,826 B2 * 11/2009 Guichard ............... H04L 45/42
                                                            713/153
8,086,635 B1    12/2011 Rinker
(Continued)

FOREIGN PATENT DOCUMENTS

| CN | 112579414 A | 3/2021 |
| JP | 2010277263 | 12/2010 |
| JP | 2022548444 | 11/2022 |

OTHER PUBLICATIONS

Supplementary European Search Report received in corresponding European patent application No. 22867893.4, dated Jun. 17, 2025, 33 pages.

*Primary Examiner* — Maung T Lwin
(74) *Attorney, Agent, or Firm* — Cooper Legal Group, LLC

(57) ABSTRACT

The present application discloses a method, system, and computer system for monitoring tasks with respect to information stored in a database system. The method includes receiving a request to execute a task with respect to a database, wherein the request is associated with an identifier corresponding to a user that inputs a query for the request; determining whether the task is authorized for the user; in response to a determination that the task is authorized for the user, obtaining a set of information that is to be returned for the task; determining a subset of the set of information, wherein the subset of the set of information comprises one or more parts of the set of information for which the user has access permission; and storing a record of the request to execute the task, wherein the record comprises an indication of the user, and an indication of subset of the set of information.

17 Claims, 11 Drawing Sheets

| Request Time | System Account | IP Address | Task | Target | Subject(s) | Activity Category |
|---|---|---|---|---|---|---|
| 7/15/2021 | User X | 0:0:0:0:0:0:0:1 | View User Activity | From Moment; To Moment; System Accounts; Tasks | not applicable | Read |
| 7/24/2021 | User Y | 0:0:0:0:0:0:0:2 | View Worker | Jane Doe (CFO, Mgr 5000) | Jane Doe (CFO, Mgr 5000) | Read |
| 8/1/2021 | User X | 0:0:0:0:0:0:0:1 | Compensation Spreadsheet | Organization Executive Management; Include Subordinate Organizations | Jane Smith (CEO, Mgr 8000); Jane Doe (CFO, Mgr 5000); John Doe (EVP; Mgr 7000) (more) | Write |
| 8/1/2021 | User X | 0:0:0:0:0:0:0:1 | View Organizational Goals | Organization; Executive Management; Goal Period: 2021 | not applicable | Read |
| 8/4/2021 | User A | 0:0:0:0:0:0:0:4 | View Stock Requests Types | Par Replenishment | not applicable | Read |
| 8/4/2021 | User A | 0:0:0:0:0:0:0:4 | View Trade Secret Log | Executive Management; Research & Development; Legal; Intellectual Property; Trade Secrets | not applicable | Read |
| 8/4/2021 | User Y | 0:0:0:0:0:0:0:2 | View R&D Project Alpha Design History | Executive Management; Research & Development; Product Design; Project Alpha | not applicable | Read |

(56) References Cited

U.S. PATENT DOCUMENTS

| | | | |
|---|---|---|---|
| 9,558,334 B2* | 1/2017 | Kling | H04L 63/0281 |
| 10,776,091 B1 | 9/2020 | Wagner | |
| 10,963,557 B2* | 3/2021 | Goodridge | G06F 21/53 |
| 11,386,221 B2 | 7/2022 | Ahmed | |
| 2002/0010679 A1 | 1/2002 | Felsher | |
| 2009/0210293 A1* | 8/2009 | Steele | G06Q 30/04 |
| | | | 705/64 |
| 2010/0094666 A1 | 4/2010 | Pendergrass | |
| 2013/0086637 A1 | 4/2013 | Cotterill | |
| 2013/0219461 A1* | 8/2013 | Esaki | H04L 63/08 |
| | | | 726/1 |
| 2016/0019241 A1* | 1/2016 | Prabaker | H04L 67/55 |
| | | | 707/783 |
| 2017/0004422 A1 | 1/2017 | Todd | |
| 2017/0286143 A1 | 10/2017 | Wagner | |
| 2018/0060460 A1 | 3/2018 | Zhang | |
| 2018/0157535 A1 | 6/2018 | Dushok | |
| 2019/0305949 A1 | 10/2019 | Hamel | |
| 2019/0361895 A1 | 11/2019 | Weaver et al. | |
| 2020/0387627 A1 | 12/2020 | Kfir | |
| 2021/0004782 A1* | 1/2021 | Toutain | G06Q 20/3223 |
| 2021/0258308 A1* | 8/2021 | Avetisov | H04L 9/0825 |

* cited by examiner

SUBJECT LOGGING

CROSS REFERENCE TO OTHER APPLICATIONS

This application is a continuation of U.S. patent application Ser. No. 17/469,675 entitled SUBJECT LOGGING filed Sep. 8, 2021 which is incorporated herein by reference for all purposes.

BACKGROUND OF THE INVENTION

A system for big data processing comprises a system for receiving data, storing data, processing data, etc. Big data processing systems typically comprise a large number of elements in one or more datasets. The one or more datasets are accessed by users associated with an organization. For example, users may input queries to a client terminal, and the queries are performed by the system for data processing. At scale, the number of accesses or queries performed against the one or more datasets is very large. For example, for large organizations, the number of transactions (e.g., queries) performed against the one or more datasets can exceed five million transactions per day. This creates a problem for auditing in that it is difficult to know what data has been accessed in a dataset and when it was accessed.

BRIEF DESCRIPTION OF THE DRAWINGS

Various embodiments of the invention are disclosed in the following detailed description and the accompanying drawings.

DETAILED DESCRIPTION

Figure 1:
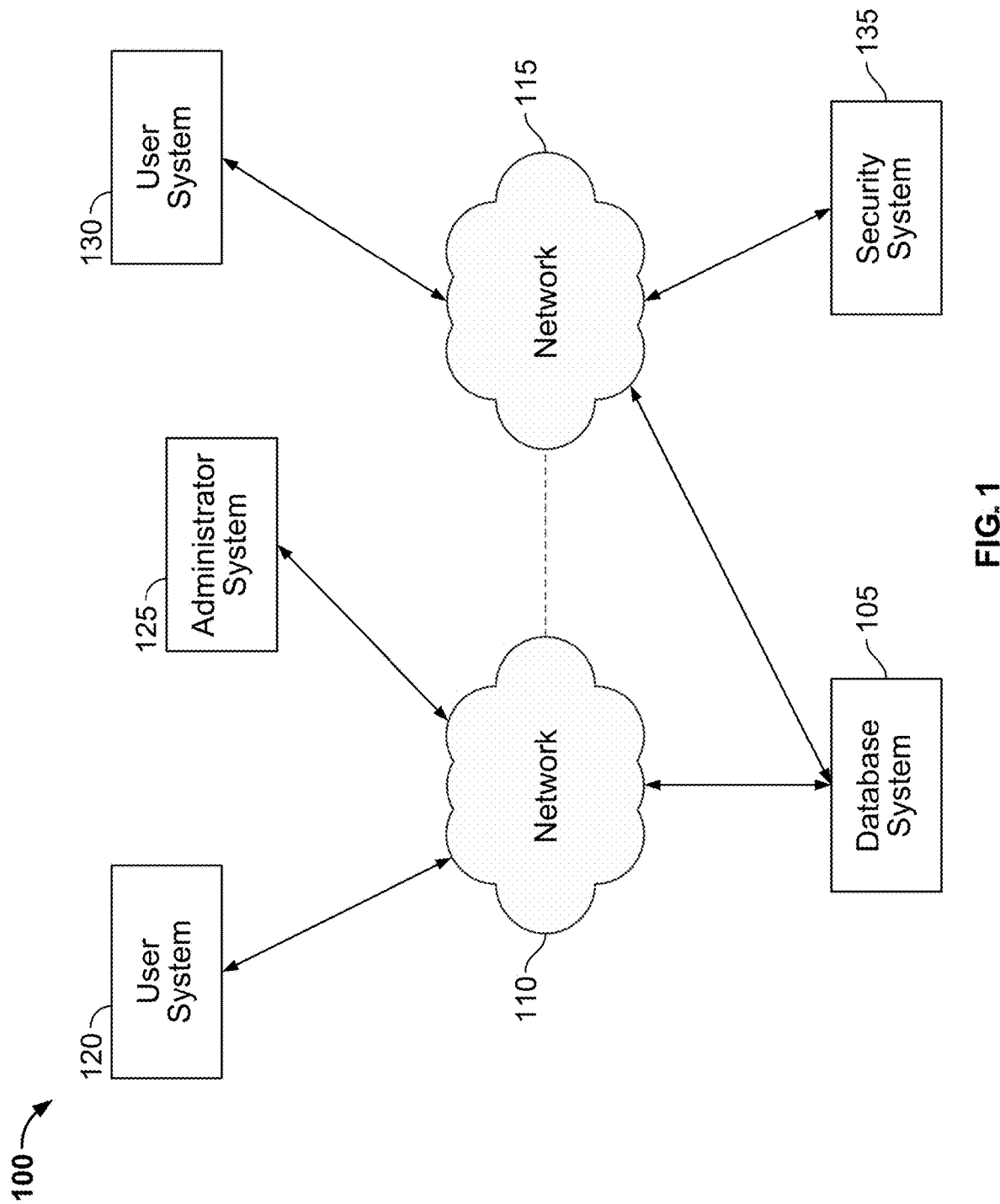
FIG. 1 is a block a diagram of a network system according to various embodiments of the present application.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system for subject logging is disclosed. The system comprises one or more processors and a memory. The one or more processors are configured to receive a request to execute a task with respect to a database, wherein the request is associated with an identifier corresponding to a user that inputs a query for the request; determine whether the task is authorized for the user; in response to a determination that the task is authorized for the user, obtain a set of information that is to be returned for the task; determine a subset of the set of information, wherein the subset of the set of information comprises one or more parts of the set of information for which the user has access permission; and store a record of the request to execute the task, wherein the record comprises an indication of the user, and an indication of subset of the set of information. The memory coupled to the processor and configured to provide the one or more processors with instructions. In some embodiments, the record comprises an indication of the subject information that the user can access to, and an indication of subset of the set of information pertaining to the subject information.

According to various embodiments, a system and/or method for monitoring user activity with respect to (e.g., against) one or more datasets is provided. In various embodiments, user activity is logged contemporaneous with a user executing a task with respect to the one or more subject information (e.g., tenant sensitive information) from the one or more underlying datasets (e.g., the user activity is logged contemporaneous with the input/performing of a query run against the one or more datasets). The log pertaining to logged user activity may comprise information indicating at least a subset of information or type of information that may have been exposed to a user in connection with that user executing a task with respect to the one or more subject information (e.g., tenant sensitive information) from the one or more underlying datasets. In some embodiments, the log may comprise a record for user activity with respect to a task that may have exposed personally identifiable information or tenant sensitive information stored in the one or more datasets against which the task was executed. The log may be searchable in connection with determining information or a type of information that may have been exposed to (e.g., returned to) the user with respect to an executed task. In some embodiments, a system or method may analyze the log to determine whether records of user activity is indicative of anomalous behavior (e.g., an indication that a user is engaging in malicious behavior, or that an account for a user has been compromised).

As used herein, personally identifiable information (which may also be referred to as PII) may comprise any data that could potentially be used to identify a particular person. Examples include a full name, Social Security number, driver's license number, bank account number, passport number, email address, and the like.

As used herein, tenant sensitive information may include sensitive information pertaining to the tenant. A tenant may be an organization associated with a database, such as a client of a software as a service provider. The sensitive information may comprise confidential and proprietary information of the tenant. Examples of the tenant sensitive information may include PII of users associated with the tenant (e.g., employees, contractors, etc. of the tenant), compensation information, trade secrets, research and development plans, etc.

As used herein, a date may correspond to a particular day, month, and/or year. The term date may also include a certain time of a day or a time of a particular day, month, and/or year.

According to various embodiments, the system receives a request to execute a task with respect to a database, wherein the request is associated with an identifier corresponding to a user that inputs a query for the request. The system may determine whether the task is authorized for the user. In response to a determination that the task is authorized for the user, the system may obtain a set of information that is to be returned for the task. The system may determine a subset of the set of information, wherein the subset of the set of information comprises one or more parts of the set of information for which the user has access permission. The system may store a record of the request to execute the task, wherein the record comprises an indication of the user, and an indication of subset of the set of information. In some embodiments, the record comprises an indication of the subject information that the user can access to, and an indication of subset of the set of information pertaining to the subject information. For example, the subject information may correspond to a person associated with a tenant (e.g., an executive of the tenant). The subject information may be PII of such person. In some embodiments, the record comprises an indication that the request to execute the task was associated with the user, and that PII was exposed to the user, and that person subject to the PII (e.g., the executive of the tenant in the above example).

According to various embodiments, the record of the request to execute the task may be stored in a log of user activity. The log of user activity may be indexed with respect to one or more predefined fields (e.g., the indication of the user such as a user identifier, an indication of the subset of the set of information that may have been returned to the user, an indication of a field name, a field name, etc.). The one or more predefined fields may be configurable such as by an administrator or tenant associated with the one or more datasets. Examples of the one or more predefined fields include, without limitation, a date and/or time when a task was executed, an indication of a user associated with the request to execute the task (e.g., a user identifier such as an employee number, a user name, an email address, a login identifier, etc.), an IP address from which the request to execute the task is received, an identifier of the terminal from which the request to execute the task is received, an indication of the type of task, an indication of a target of type of information (e.g., a department associated with the information that may have been returned, a category or sub-organization in which the information may have been returned, a type of report requested, etc.), a subject of the information that may have been returned (e.g., a person such as an executive that for which corresponding information may have been returned, etc.), a type of activity executed (e.g., a read, a write, a delete, etc.). Various other types of information may be implemented as a predefined field. According to various embodiments, a record comprised in the log is immutable. For example, the log itself is not immutable (e.g., the log changes over time in that new records are added to the log), however a record, once inserted in the log is immutable.

According to various embodiments, a plurality of records or information respectively pertaining to a corresponding request to execute a task may be contemporaneously committed to a log (e.g., committed to a log of user activity). For example, the plurality of records may be stored in a logging queue, and at least a subset of records in the logging queue may be committed in a batch. The batch comprising the at least a subset of records may be committed in response to a determination that a batching criteria is satisfied. In some embodiments, the storing of the record comprises storing information pertaining to the record in a logging queue, determine that one or more batching criteria associated with committing records is satisfied, and in response to determining that the one or more batching criteria is satisfied, commit to a log information pertaining to the record in the logging queue. In some embodiments, the one or more batching criteria include a threshold number of records in the logging queue (e.g., in response to a determination that a logging queue comprises a number of records equal to or greater than the threshold number of records, the batching criterion may be deemed satisfied). In some embodiments, the one or more batching criteria may include a threshold amount of time that has elapsed since a last commitment of records in the logging queue. Various other criteria may be implemented as the one or more batching criteria.

According to various embodiments, the log may be searchable by a permitted user of the database system. As an example, the permitted user may be an administrator or other user with permissions to view/use the log. The permitted user may be authenticated based at least in part on a user credential, and/or access permissions corresponding to the permitted user. In some embodiments, the permitted user may query the log based at least in part on one or more of a type of information that was returned with respect to one or more tasks for which a record is stored in the log. The log may provide information in a manner that restricts information provided to the permitted user based on the access permissions of the permitted user. As an example, the log may point to information (e.g., information that may have been returned the user in response to execution of the task) but does not store the subset of the set of information returned to the user in response to the request to execute the task with respect to the database. The log may comprise a link (e.g., a hyperlink) via which the permitted user may attempt to access the underlying information that may have been returned to the user in connection with executing the task. In some embodiments, at least part of the log may be provided to another user (e.g., an administrator, etc.), the log being provided in a manner that provides a selectable link to at least part of the subset of the set of information to which the log points. In response to receiving an input to select the selectable link, the system or method (e.g., a security system or authentication system) may determine whether the other user is permitted to access information to which the selectable link points. In response to a determination that the other user is permitted to access the information to which the selectable link points, the other user may be permitted to the access information to which the selectable link points.

According to various embodiments, the log of user activity may be searchable. The log may be searchable based at least in part on an identifier of a user. For example, in connection with determining tasks executed by a particular user, or information that may have been provided to the particular user, the log may be searched based on a user identifier corresponding to the particular user, etc. In some embodiments, the log may be searchable least in part on an identifier associated with the information returned with respect to one or more tasks for which a record is stored in the log. For example, a permitted user may search the log for all users or tasks that may have returned in response to executed tasks that have been logged (e.g., over a defined period of time or with respect to certain date and/or time restrictions, etc.). As an example, if a user wants to determine who may have had access to executive compensation, the log may be searched based on executive compensation as a type of information that may have been returned in response to an executed task. In response to the query of the log for tasks that may have returned executive compensation, the permitted user may be provided with a report that comprises information pertaining to tasks that have been executed for which executive compensation may have been returned (e.g., the information may include date and/or time, user that requested execution of the task, an IP address from which the request to execute the task was received, a terminal from which the request to execute the task was received, a context of the terminal from which the request to execute the task was received, a type of task for which the information may have been returned to the user, etc.). The fields included in the report may be configurable, such as by a permitted user (e.g., when requesting report), or by an administrator or organization such as in connection with a definition of a default report configuration.

According to various embodiments, the log of user activity may be used in connection with determining data breaches and/or detecting anomalous behavior. In some embodiments, a machine learning process is used in connection with determining anomalous behavior. For example, the machine learning process may determine that a request to execute a task is anomalous. The determination that a request to execute the task is anomalous based at least in part on a determination that information associated request to execute the task is a statistical outlier with respect to a context in which the request to execute to execute the task is made (e.g., a user that requesting to execute the task, a location from which the request to execute the task is received, a time at which the request to execute the task is received, a set of requests to execute tasks that is received contemporaneous with the determined anomalous request to execute the task, a series of requests to execute tasks within which the determined anomalous request to execute the task is included, etc.).

Related art systems for recording user activity with respect to a dataset includes recording of the input parameters (e.g., the query input by a user) for a task executed by a user against one or more datasets. According to such related art systems, an administrator or organization have been able to query what tasks a specific user executed, including updates, views, and downloads. However, the recording of the user activity according to such related art systems does not provide a method or system with which the administrator or organization may easily or effectively determine the information provided to the user (e.g., the results of the tasks executed against the one or more datasets). For example, an administrator or organization associated with such related art systems would be required to obtain the historical information pertaining to the user activity, restore the data for the dataset as of the date and/or time when the specific user activity was performed, and re-running the task that the user had executed at that date and/or time. The foregoing related art system may be sufficient for compliance purposes, however, such a system does not providing auditing capability and also does not scale to a large number of transactions and does not permit a proactive monitoring of user activity and near real-time detection of anomalous behavior with respect to datasets.

Other related art systems may record user activity by activating a tracing at the database level or database table level. If tracing is activated, every request to the database is logged to a server (e.g., a database). The logging of the request is performed nearly in real time, however, such logging is in a log format and at scale the data stored in the corresponding log is voluminous. Because the tracing data is stored in a log format, the information pertaining to user activity is not indexed (e.g., the data is not in an indexed reportable format). Further, the activation of the tracing at the database level or database table level may result in data that is generic to all SQL queries rather than being optimized for queries for which an administrator or organization wishes to monitor.

In contrast to the related art systems, various embodiments generate a log of user activity with respect to one or more datasets in near real time. The log may include information indicating a user (e.g., a user identifier) associated with a task executed with respect to the one or more datasets, and an indication of at least part of the information, or type of information, provided to the user. The log may be indexed based at least in part on one or more predefined fields. In some embodiments, the log may be searchable or used in connection with anomaly detection. For example, the log may be analyzed in real time, or near real time. The method and system for monitoring user activity according to various embodiments may be more extensible and efficient for analyzing user activity to determine information (or a type of information) that may have been returned to a user in response to an executed task, and/or to determine whether a user is engaging in anomalous behavior.

The system improves the computer by enabling more efficient identification of users that have accessed data. The system stores access data using a batching process for more efficient storage with a lower burden on processor and memory resources. The system enables identification of patterns of anomalous access to data. In some embodiments, the system provides warnings and/or prevents access based on a pattern of access.

FIG. 1 is a block a diagram of a network system according to various embodiments of the present application. In the example illustrated in FIG. 1, system 100 includes server database system 105, one or more user systems 120 and/or 130, an administrator system 125. System 100 further includes one or more networks such as network 110 and/or network 115 over which the one or more user systems 120 and/or 130, and/or administrator system 125 communicate with database system 105. In various embodiments, network 110 and/or 115 include one or more of a wired network, and/or a wireless network such as a cellular network, a wireless local area network (WLAN), or any other appropriate network. System 100 further includes security system 135. In some embodiments, database system 105 and/or security system 135 is implemented by a server. The server may correspond to a single server or a plurality of servers. Similarly, system 100 may include various other systems or terminals.

In various embodiments, user system 120 and/or user system 130 is implemented by one or more client terminals such as a personal computer, a mobile phone, a tablet, or any other appropriate user device. User system 120 and/or user system 130 communicates with database system 105 and/or security system 135 via a web-interface. For example, user system 120 and/or user system 130 communicates with database system 105 and/or security system 135 via a web-browser installed on user system 120 and/or user system 130. As another example, user system 120 and/or user system 130 communicate switch database system 105 and/or security system 135 via an application running on user system 120 and/or user system 130. A user uses user system 120 or user system 130 to access database system 105. For example, a user uses user system 120 to access human resources database data on database system 105, a user uses user system 120 or user system 130 to access financial database data on database system 105, a user uses user system 120 or user system 130 to modify data on database system 105, a user uses user system 120 to delete data on database system 105, etc. In some embodiments, a user additionally uses user system 120 or user system 130 to a log of user activity either directly or via database system 105 or security system 135.

Administrator system 125 comprises an administrator system for use by an administrator. For example, administrator system 125 comprises a system for communication, data access, computation, etc. An administrator uses administrator system 125 to maintain database system 105. For example, an administrator uses administrator system 125 to start and/or stop services on database system 105, to reboot database system 105, to install software on database system 105, to add, modify, and/or remove data on database system 105, etc. Administrator system 125 communicates with database system 105 and/or security system 135 via a web-interface. For example, administrator system 125 communicates with database system 105 and/or security system 135 via a web-browser installed on administrator system 125. As another example, administrator system 125 communicates with database system 105 and/or security system 135 via an application running on administrator system 125.

The database system 105 stores one or more datasets. In various embodiments, the one or more datasets comprise human resources data, financial data, organizational planning data, or any other appropriate data. In some embodiments, the database system 105 stores one or more datasets for a plurality of tenants. For example, the database system 105 hosts at least part of a software as a service (e.g., a database storing data for the service) for a plurality of tenants such as customers for a provider of the software as a service). In various embodiments, a tenant comprises an organization such as a company, a government entity, a sub-organization of an organization (e.g., a department), or any other appropriate organization. In some embodiments, database system 105 stores one or more datasets comprising tenant sensitive information such as PII (e.g., PII of a person associated with a tenant), etc. For example, database system 105 comprises a database system for storing data in a table-based data structure, an object-based data structure, etc. In various embodiments, database system 105 comprises a business database system, a human resources database system, a financial database system, a university database system, a medical database system, a manufacturing database system, or any other appropriate system. In some embodiments, database system 105 comprises an object-oriented database system.

According to various embodiments, a user uses user system 120 or user system 130 to execute one or more tasks with respect to data (e.g., one or more datasets) stored on database system 105. For example, a user inputs to user system 120 a query or request to execute a task (e.g., run a query against a dataset) at database system 105, and database system 105 receives the query or request to execute the task from user system 120 via network 110, etc. In response to receiving the query or request to execute the task, database system 105 executes the task and provides a result to the user via user system 120. In some embodiments, the result comprises information or a set of information that is responsive to the query or execution of the task. In some embodiments, the result comprises a report including information that is responsive to the query or execution of the task or selectable elements (e.g., links such as hyperlinks) that point to information that is responsive to the query or execution of the task.

In some embodiments, database system 105 stores a log of user activity. For example, database system 105 stores a log of user activity with respect to one or more databases (e.g., one or more datasets) stored at database system 105. In some embodiments, database system 105 stores a record of user activity contemporaneous with receiving, from a user of user system 120 or user system 130, a request to execute a task (e.g., run a query against a dataset), or contemporaneous with execution of the task. In some embodiments, a record of user activity is stored in a log, such as a log of user activity. In some embodiments, the log is indexed according to one or more predefined fields (e.g., an identifier of the user, an indication of the task or a type of task, an indication of a result of the execution of the task, etc.). In some embodiments, the log is searchable by one or more permitted users. For example, a permitted user searches the log to determine user activity of a particular user, or a report of users to which a particular type of information or piece of information has been returned.

In some embodiments, an administrative user or another user (e.g., a permitted user) searches the log stored by database system 105. For example, an administrative user inputs a query to administrator system 125 in connection with querying or searching the log. For example, a user inputs a query to user system 120 in connection with querying or searching the log. In response to receiving parameters associated with the query of the log, database system 105 or security system 135 returns results pertaining to the querying or searching the log. As an example, if the administrative user queries the log for an indication of users that has had access to information pertaining to executive compensation between a first date and a second date, database system 105 or security system 135 returns a report including information pertaining to records in the log of user activity for which executive compensation has been exposed to a user (e.g., the report includes information for records corresponding to a task executed between the first date and the second date, etc.).

According to various embodiments, security system 135 provides security with respect to database system 105. For example, security system 135 determines information (or a set of information, etc.) that a particular is permitted to access. As an example, security system 135 determines whether a user has permission to access information based at least in part on a mapping of user permissions to information. As another example, security system 135 determines whether a user has permission to access information based at least in part on a determination that an object corresponding to the information (e.g., to a piece of information or to a plurality of pieces of information) comprises an attribute or information indicating that the user has permission to access such object. In some embodiments, security system 135 authenticates a user that is accessing database system 105, or security system 135 otherwise uses a credential associated with the user in connection with determining whether a user is permitted to perform a particular activity or to have access to certain information.

In some embodiments, in response to execution of a task (e.g., running a task against a dataset in response to a user request to execute the task, performing a query against the log of user activity, etc.), database system 105 determines information responsive to execution of the task, and security system 135 determines a subset of the information responsive to execution of the task for which the user associated with the request to execute the task/query has the requisite access permissions. In some embodiments, security system 135 filters information and outputs only information that the requesting user is permitted to access.

According to various embodiments, an anomaly detection process is executed in connection with detecting anomalous behavior with respect to data stored on database system 105 (e.g., anomalous user behavior such as accessing certain tenant sensitive information, etc.). The anomaly detection process is executed on database system 105 and/or security system 135. In some embodiments, a machine learning module or process is implemented in connection with the anomaly detection process. For example, a machine learning module or process is trained using a dataset of historical user activity or activity with respect to one or more datasets stored on database system 105 (or one or more datasets similar to the one or more datasets stored on database system 105 such as datasets from a plurality of similarly situated tenants, or a plurality of tenants storing similar information, etc.). The anomaly detection process analyzes information in a log of user activity in connection with determining whether a record in the log of user activity corresponds to an anomalous behavior. In some embodiments, the anomaly detection runs in the background or contemporaneous with the execution of tasks with respect to data stored on database system 105. For example, the anomaly detection process detects anomalous behavior in real time, or near real time, with the execution of tasks with respect to data stored on database system 105 (e.g., contemporaneous with the user activity).

In response to detecting anomalous behavior, one or more active measures are performed or initiated. The active measures are performed by database system 105 and/or security system 135. Examples of the active measures include notifying an administrative user, notifying one or more particular users associated with the tenant (e.g., a data privacy officer, a human resources representative, an executive, etc.), restricting access for the user for which anomalous behavior is detected (e.g., restricting execution of future queries or tasks with respect to the database system 105 such as at least until such restriction is released by an administrative user, etc.). In some embodiments, the one or more active measures are performed automatically in response to detection of the anomalous behavior. In some embodiments, a prompt is provided to an administrative user for activation of the one or more active measures. For example, the prompt includes a notification of the anomalous behavior, a recommendation of one or more active measures to be performed, and/or a selectable element to initiate an active measure.

In some embodiments, database system 105 and security system 135 are implemented on a single server or a plurality of servers. For example, database system 105 and security system 135 are different modules running on a same server or set of servers.

Figure 2:
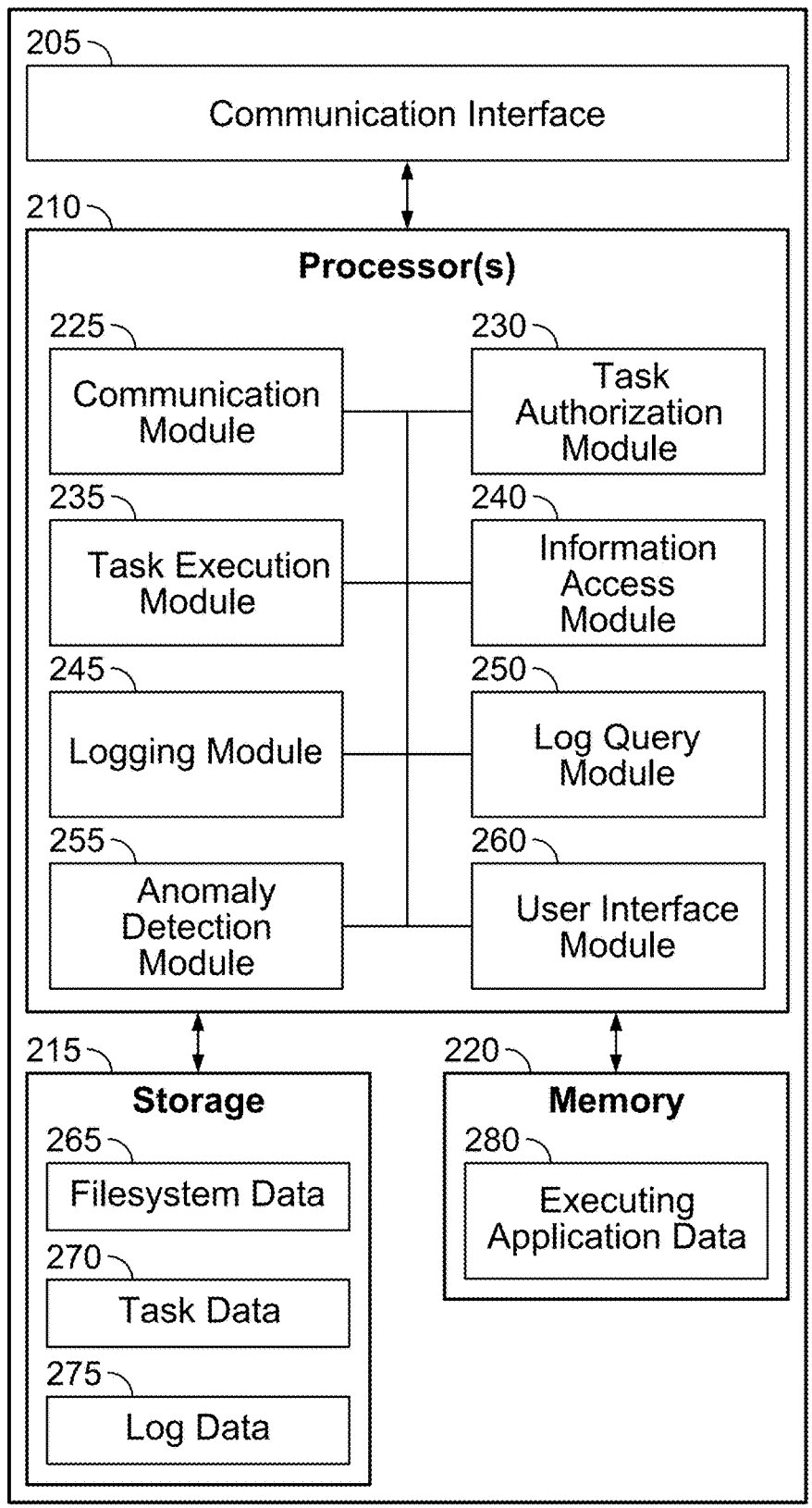
FIG. 2 is a block diagram of a database system according to various embodiments of the present application.

FIG. 2 is a block diagram of a database system according to various embodiments of the present application. In some embodiments, database system 200 comprises, or corresponds to, database system 105 of system 100 of FIG. 1. System 200 may implement process 300 of FIG. 3, process 500 of FIG. 5, process 600 of FIG. 6, process 700 of FIG. 7, process 800 of FIG. 8, process 900 of FIG. 9, and/or process 1000 of FIG. 10. System 200 may implement log 400 of FIG. 4.

In the example shown, system 200 implements one or more modules in connection with managing data in one or more datasets and/or monitoring user activity with respect to the one or more datasets. System 200 comprises communication interface 205, one or more processors 210, storage 215, and/or memory 220. One or more processors 210 comprises one or more of communication module 225, task authorization module 230, task execution module 235, information access module 240, logging module 245, log query module 250, anomaly detection module 255, and/or user interface module 260.

In some embodiments, system 200 comprises communication module 225. System 200 uses communication module 225 to communicate with various client terminals or user systems such as user system 120, user system 130, and/or administrator system 125. For example, communication module 225 provides to communication interface 205 information that is to be communicated. As another example, communication interface 205 provides to communication module 225 information received by system 200. Communication module 225 is configured to receive one or more queries or requests to execute tasks such as from various client terminals or user systems. The one or more queries or requests to execute tasks is with respect to information stored in one or more datasets. Communication module 225 is configured to provide to various client terminals or user systems information such as information that is responsive to one or more queries or tasks requested to be executed. In some embodiments, communication module 225 provides the information to the various client terminals or user systems information in the form of one or more reports (e.g., according to a predefined format or to a requested format), and/or via one or more users interfaces (e.g., an interface that user system 120 is caused to display).

In some embodiments, system 200 comprises task authorization module 230. According to various embodiments, task authorization module is implemented in security system 135 of system 100 of FIG. 1. System 200 uses task authorization module 230 in connection with determining whether a task or query is permitted or authorized. In some embodiments, in response to receiving a request to execute a task (e.g., in response to receiving a query), system 200 uses task authorization module 230 in connection with determining whether the user is permitted to execute the task (e.g., is permitted to request the task). Task authorization module 230 determines whether a user is permitted to execute the task (e.g., is permitted to request the task) based at least in part on a set of permissions associated with the user (e.g., an account of the user, a role of the user, an attribute of the user, etc.). In some embodiments, the task authorization module 230 determines whether the task/query is permitted to be performed for the user based at least in part on performing a lookup with respect to a mapping of permissions to tasks. In response to task authorization module 230 determining that the task (e.g., query) is permitted, system 200 performs the task. In response to determining that the task is not permitted, system 200 restricts performance of the task. For example, system 200 provides a notification that indicates that the task is not permitted. In some embodiments, the notification includes a selectable element that allows a user to input credentials that upon authentication may permit the performance of the task for the user. In some embodiments, system 200 provides the notification that indicates that the task is not permitted to the client terminal or user system (e.g., user system 120).

In some embodiments, system 200 comprises task execution module 235. System 200 uses task execution module 235 to execute the task. For example, in the case of the task being a query comprising one or more query parameters, task execution module 235 performs the query against the corresponding one or more datasets, and task execution module 235 determines information comprised in the one or more datasets that is responsive to the query. In some embodiments, task execution module 235 determines information responsive to the execution of the task (e.g., the query) without regard to the user from which the request to execute the task originated. For example, system 200 further filters the information based on the user and/or user access permissions after first determining the information responsive to the execution of the task. Task execution module 235 deconstructs the task parameters such as a query string input by the user, and performs the task based at least in part on at least a subset of the task parameters.

In some embodiments, system 200 comprises information access module 240. System 200 uses information access module 240 to determine at least a subset of information that is responsive to the execution of the task that the user is permitted to access (e.g., information that is permitted to be returned to the user). Information access module 240 is implemented by database system 105 of system 100 of FIG. 1, and/or security system 135. In some embodiments, information access module 240 provides to a security system the information that is responsive to execution to the task, and receives the subset of such information that the user is permitted to access. For example, the security system filters the responsive information to include only such information for which the user has the applicable access permissions.

In some embodiments, system 200 comprises logging module 245. System 200 uses logging module 245 to record user activity such as user activity with respect to one or more or more datasets. In various embodiments, logging module 245 is implemented by database system 105 of system 100 of FIG. 1, and/or security system 135 of system 100. According to various embodiments, logging module 245 is configured to store one or more records of user activity with respect to the one or more or more datasets. As an example, the one or more records are stored in a log. As another example, the one or more records are stored (e.g., temporarily) in a logging queue. In some embodiments, a plurality of records (e.g., information) in the logging queue is committed to the log as a batch, such as in response to one or more batching criteria being satisfied. The one or more batching criteria are based at least in part on a threshold number of records in the logging queue, a time that has elapsed since a last commitment of records to the log, a date and/or time, etc. In various embodiments, the logging queue is stored locally or in cache (e.g., the logging queue may be stored in the security system 135), the log is stored at a remote storage and/or in an indexed storage, (e.g., the log may be stored at database system 125), or is stored at any other appropriate system. The queuing of records (e.g., queueing of user activity) and/or thread pool optimization allow for record logging for view of numerous users (e.g., millions of users or more, etc.) without a negative impact on the system such as a system that also captures and reports on tenant data (e.g., customer employee records, etc.). According to various embodiments, a record comprised in the log is immutable.

In some embodiments, system 200 comprises log query module 250. System 200 uses log query module 250 to search a log (e.g., run a query against a log). In various embodiments, log query module 250 is implemented by database system 105 of system 100 of FIG. 1, and/or security system 135 of system 100. In some embodiments, log query module 250 is configured to receive a query or request to execute a task with respect to a log (e.g., the log of user activity). For example, log query module 250 receives a query or request to execute a task from communication interface 205, etc. and deconstructs the query or requests to execute the task to determine one or more parameters for querying or executing a task with respect to the log. In response to receiving the query or request to execute a task with respect to a log, log query module 250 performs the query or execution of the task with respect to the log. For example, log query module 250 determines, from a corresponding log, information that is responsive to the query or task. System 200 provides the information that is responsive to the query or task to the user (e.g., to user system 120, administrator system 125, etc.). For example, the information that is responsive to the query or task to the user is provided in a report, etc.

In some embodiments, system 200 comprises anomaly detection module 255. System 200 uses anomaly detection module 255 to detect anomalous behavior such as anomalous user activity with respect to the one or more datasets (e.g., anomalous querying, etc.). In various embodiments, anomaly detection module 255 is implemented by database system 105 of system 100 of FIG. 1, and/or security system 135 of system 100. The anomalous user activity is detected based at least in part on an analysis of the records pertaining to user activity such as records in a logging queue, and/or records in a log (e.g., records that have been committed to the log from the logging queue). According to various embodiments, the log of user activity is used in connection with determining data breaches and/or detecting anomalous behavior. In some embodiments, a machine learning process is used in connection with determining anomalous behavior. For example, the machine learning process determines that a request to execute a task is anomalous. The determination that a request to execute the task is anomalous based at least in part on a determination that information associated request to execute the task is a statistical outlier with respect to a context in which the request to execute to execute the task is made (e.g., a user that requesting to execute the task, a location from which the request to execute the task is received, a time at which the request to execute the task is received, a set of requests to execute tasks that is received contemporaneous with the determined anomalous request to execute the task, a series of requests to execute tasks within which the determined anomalous request to execute the task is included, etc.).

In some embodiments, system 200 comprises user interface module 260. System 200 uses user interface module 260 in connection with configuring information (or the display thereof) to be provided to the user such as via user system 120, user system 130, and/or administrator system 125. User interface module 260 is implemented by database system 105 of system 100 of FIG. 1. In some embodiments, user interface module 260 configures a user interface to be displayed at a client terminal used by the user or administrator, such as an interface that is provided in a web browser at the client terminal. In some embodiments, user interface module 260 configures the information to be provided to the user such as configuring one or more reports of information that is responsive to a query or task executed with respect to database system 105 (e.g., a query or task executed against one or more datasets).

According to various embodiments, storage 215 comprises one or more of filesystem data 265, task data 270, and/or log data 275. Storage 215 comprises a shared storage (e.g., a network storage system) and/or database data, and/or user activity data. In some embodiments, filesystem data 265 comprises a database such as one or more datasets (e.g., one or more datasets for one or more tenants, etc.). Filesystem data 265 comprises data such as a dataset for training a machine learning process, historical information pertaining user activity, a human resources database, a financial database, etc.). In some embodiments, task data 270 comprises information pertaining to a task or query being executed, and/or historical information for tasks or queries that have been executed. In some embodiments, log data 275 comprises a log such as a log of user activity. The log includes information indicating a high-level description of information that has been exposed to a user in connection with a query or task and/or a pointer to information that has been exposed to a user in connection with a query or task and/or to information that is responsive (e.g., as of the date and/or time that the query/task was executed) to the query or task. Log data 275 stores indexed data such as a log that is indexed according to one or more predefined fields, etc.

According to various embodiments, memory 220 comprises executing application data 280. Executing application data 280 comprises data obtained or used in connection with executing an application. In embodiments, the application comprises one or more applications that perform one or more of receive and/or execute a query or task, generate a report and/or configure information that is responsive to an executed query or task, and/or to provide to a user information that is responsive to a query or task. Other applications comprise any other appropriate applications (e.g., an index maintenance application, a communications application, a chat application, a web browser application, a document preparation application, a report preparation application, a user interface application, a data analysis application, an anomaly detection application, a user authentication application, etc.).

Figure 3:
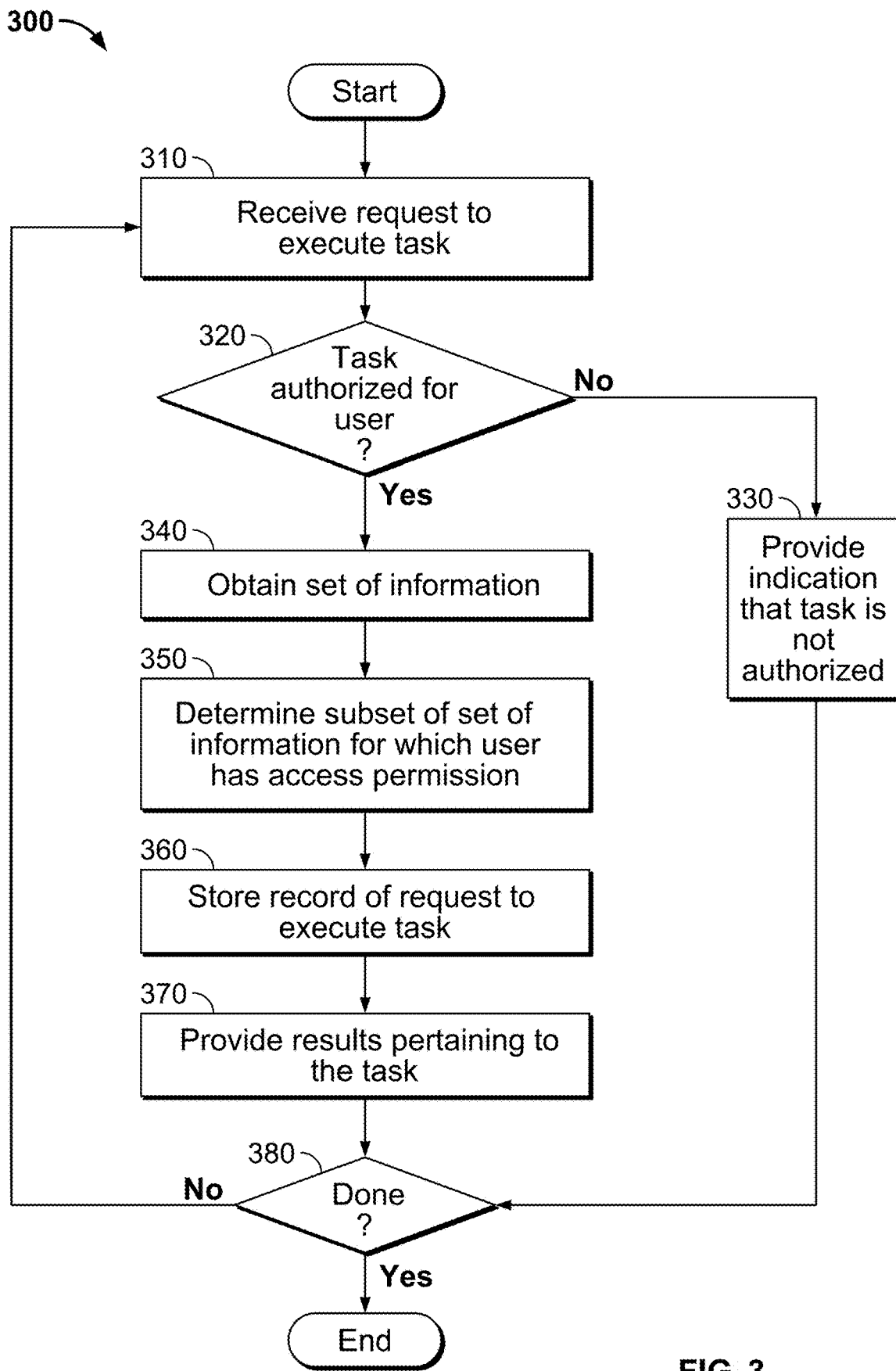
FIG. 3 is a flow diagram of a method for logging user activity with respect to a database system according to various embodiments of the present application.

FIG. 3 is a flow diagram of a method for logging user activity with respect to a database system according to various embodiments of the present application. In some embodiments, process 300 is implemented by at least part of system 100 of FIG. 1 and/or system 200 of FIG. 2. In some embodiments, process 300 is implemented in connection with generating log 400 of FIG. 4. According to various embodiments, process 300 is implemented by a security subsystem of a system that manages one or more datasets and/or software as a service. For example, process 300 is implemented by security subsystem 135 of system 100 of FIG. 1.

At 310, a request to execute a task is received. In some embodiments, the request to execute the task is received from a user, such as via a user input to a client terminal. For example, the request to execute the task is input by the user to user system 120 and/or user system 130. As another example, the request to execute the task is input by an administrator to administrator system 125. As another example, the request to execute the task is initiated automatically on behalf of a user such as in connection with providing a dashboard or other user interface provided to the user (e.g., a dashboard report such as a report indicating a number of vacation days submitted for employees in an organization with which the user is associated). The request to execute the task can be received in response to a determination that the dashboard or other user interface to be provided to the user is to be refreshed, such as in accordance with a predefined schedule or refreshing frequency. The request to execute the task can be received in response to a determination that the system is to automatically provide to the user information such as information determined to be interesting (e.g., information that is determined to be an outlier or statistically relevant, information that the system infers the user would like to receive such as based on a time of day, month, year, etc., information collected as a story for the user such as information that provides an indication or summary of trends, etc.). As an example, the system determines information to be (or expected to be) interesting to a user based on a context of a user (e.g., a user interface to which the user has navigated, a type of information the user is determined to frequently review at a certain time of day, week, month, or year, etc., etc.), a context of the system, or a context of the information responsive to the task (e.g., a determination that the information responsive to the task includes an outlier or anomaly, etc., such as a number of employees having upcoming vacation days, etc.).

The request to execute the task comprises one or more parameters pertaining to the task. As an example, in the case that the task is a query, the one or more parameters comprise a query string, etc. The one or more parameters pertaining to the task includes a task definition (e.g., a query string), an indication of the database (e.g., one or more datasets) with which the task is to be executed, etc. In some embodiments, the request to execute the task includes identifying information such as information that identifies a user or terminal from which the request to execute the task is received (e.g., a user identifier, a login name, an email address, an IP address, a MAC address, a terminal identifier, etc.), and/or a credential associated with the user or terminal. As an example, in the case of the request to execute the task being initiated automatically on behalf of a user, the system authenticates the user on behalf of whom the request to execute the task is automatically initiated. For example, the request to execute the task includes a credential (e.g., a login identifier and/or password) associated with the user.

At 320, a determination of whether the task is authorized for the user is performed. In some embodiments, in response to receiving the request to execute the task, the system determines whether the task is authorized for the user (e.g., whether the user has the requisite permissions to execute the task). The determination of whether the task is authorized for the user is performed by an authentication or security system (e.g., a security subsystem) such as security system 135 of system 100 of FIG. 1. In some embodiments, the determination of whether the task is authorized for the user may be based at least in part on a set of permissions associated with the user (e.g., an account of the user, a role of the user, an attribute of the user, etc.). For example, the determination of whether the task is authorized for the user is based at least in part on a mapping of user permissions to tasks.

In response to a determination that the task is not authorized for the user at 320, process 300 proceeds to 330 at which an indication that the task is not authorized for the user is provided. The system communicates to a client terminal, such as user system 120 of system 100 of FIG. 1, the indication that the task is not authorized for the user is provided. For example, the system causes the client terminal to display a prompt or indication that the requested task is not permitted. Process 300 then proceeds to 380.

In response to a determination that the task is authorized for the user at 320, process 300 proceeds to 340 at which a set of information is obtained. In some embodiments, in response to determining that the task is authorized, the system determines a set of information that is a result of executing the task. For example, in the case of the task being a query, in response to determining that the query is authorized for the user, the system runs the query against one or more applicable datasets and determines a set of information that is responsive to the query.

According to various embodiments, the obtaining the set of information comprises the security system 135 querying a database system (e.g., database system 105 of system 100 of FIG. 1). The database system is queried based at least in part on one or more parameters comprised in, or associated with, the request to execute the task.

At 350, a subset of the set of information for which the user has access permission(s) is determined. In response to the set of information being obtained, the system determines a subset of such set of information. The subset is determined based on a determination of which of the set of information (e.g., the results of the task such as information responsive to a query) the user has access permissions. In some embodiments, a security subsystem such as security system 135 determines whether a user has permission to access information based at least in part on a mapping of user permissions to information. In some embodiments, a security subsystem such as security system 135 determines whether a user has permission to access information based at least in part on a determination that an object corresponding to the information (e.g., to a piece of information or to a plurality of pieces of information) comprises an attribute or information indicating that the user has permission to access such object. The subset of the set of information for which the user has access permission(s) corresponds to information to which the user is exposed in connection with executing the task.

At 360, a record of the request to execute the task is stored. In some embodiments, the system stores a record of the request to execute the task and/or information to which the user requesting execution of the task has been exposed or accessed (e.g., in response to execution of the task). The storing of the record creates a historical record of information a particular user has accessed or been exposed such as in connection with a particular request to execute the task. The record comprises information that identifies the user such as information that identifies a user or terminal from which the request to execute the task is received (e.g., a user identifier, a login name, an email address, an IP address, a MAC address, a terminal identifier, etc.), and/or a credential associated with the user or terminal. In some embodiments, the record comprises a date and/or time that the task was requested and/or executed, a context of the terminal from which the request to execute the task was received, a type of task for which the information has been returned to the user, a subject of the information (e.g., a person whose PII may have been exposed to, or accessed by, the user), etc. In some embodiments, the record includes information pertaining to a process that initiated the task. For example, in the case when the request to execute the task is initiated automatically on behalf of a user such as in connection with providing a dashboard or other user interface provided to the user, the system stores information pertaining the process that initiated the request to execute the task on behalf of the user and/or context pertaining to the automatic initiation of the task (e.g., an identifier associated with the process that initiated the task, etc.). In some implementations, in such a case where the request to execute the task is automatically initiated, the record includes an identifier associated with the process that initiated the task, and an identifier of one or more users to which the information may have been exposed (e.g., user(s) for whom the process automatically initiated the task).

At 370, results pertaining to the task are provided. The providing of the results pertaining to the task are performed contemporaneously with the storing of the record of the request to execute the task. In some embodiments, the results pertaining to the task are provided in a report or in connection with populating a predefined or configurable template. According to various embodiments, the results pertaining to the task correspond to the subset of the set of information (e.g., the information responsive to a query) for which the user has access permission. The system causes a user interface of a client terminal to provide the results pertaining to the tasks, such as by causing the user interface to display a report comprising the subset of the set of information.

At 380, a determination is made as to whether process 300 is complete. In some embodiments, process 300 is determined to be complete in response to a determination that the user has indicated that no further queries or tasks are to be executed, the user has exited the system, an administrator indicates that process 300 is to be paused or stopped, and/or anomalous behavior (e.g., anomalous user activity) is detected. In response to a determination that process 300 is complete, process 300 ends. In response to a determination that process 300 is not complete, process 300 returns to 310.

Figure 4:
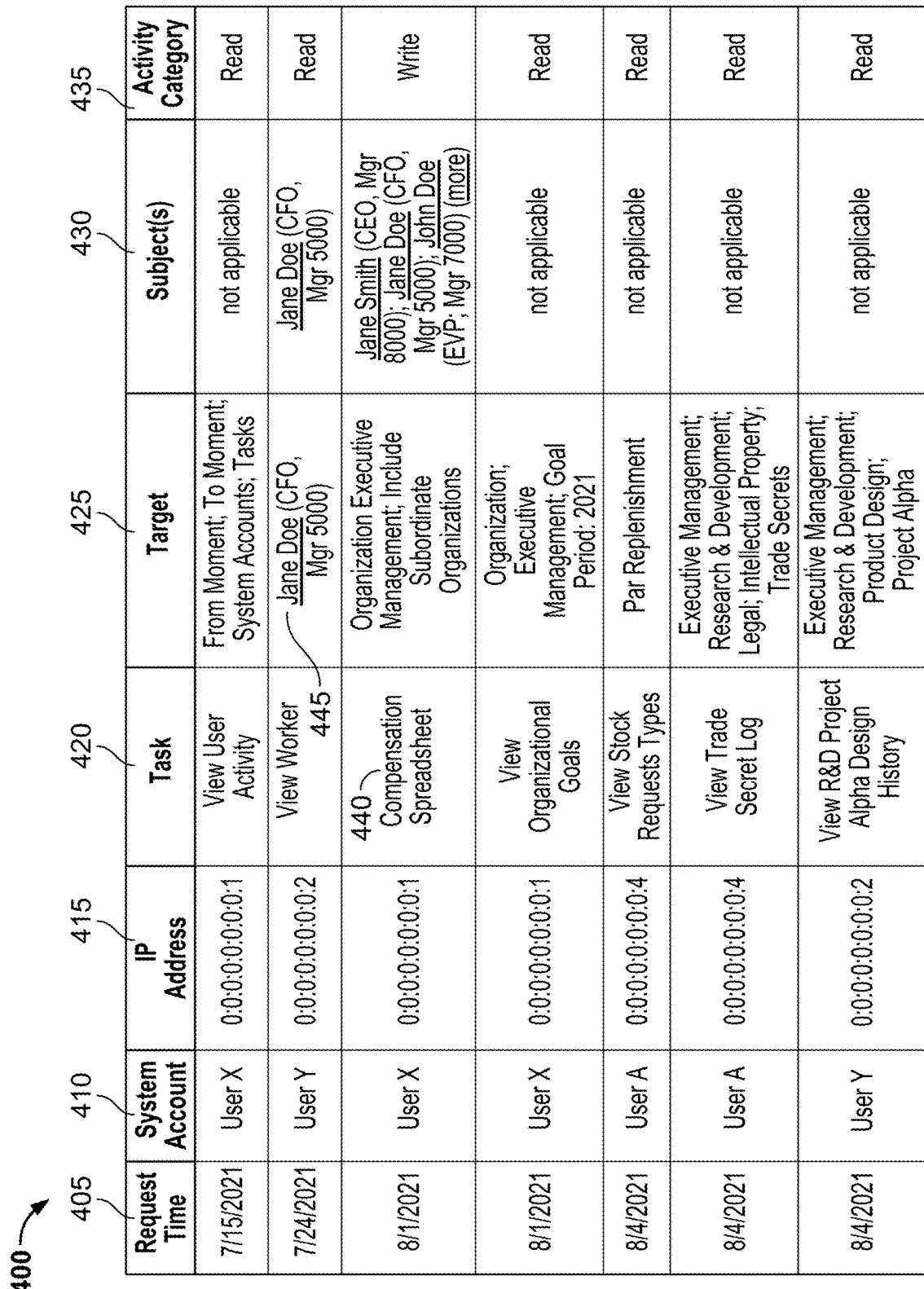
FIG. 4 is a diagram of a log of user activity with respect to a database system according to various embodiments of the present application.

FIG. 4 is a diagram of a log of user activity with respect to a database system according to various embodiments of the present application. In the example illustrated, log 400 comprises a set of predefined fields such as fields according to which information comprised in log 400 is indexed.

As illustrated in FIG. 4, log 400 comprises the following fields a request time field 405, a system account field 410, an IP address field 415, a task field 420, a target information field 425, a subject information field 430, and/or activity category field 435. According to various embodiments, a record comprised in the log is immutable. For example, information stored in a field of a record stored in the log does not change over time. As another example, the information stored in a field of a record in the log cannot be changed. In some embodiments, the information stored in a field of a record of the log does not change in connection with changes to target information pointed to by the information stored in a field. For example, if information stored in a field comprises "executive compensation spreadsheet" and the target information corresponding to it is renamed in the tenant system to correspond to "executive pay spreadsheet," then all the logged records that had previously been recorded so far still contain "executive compensation spreadsheet" and any future access to the target information would be logged to include the updated label of the target information The log records capture user activity as it happens in time.

Request time field 405 comprises date and/or time information when the request to execute the task is received or when the task is executed.

System account field 410 comprises account information pertaining to the user associated with the request to execute the task, such as a user to which the information has been exposed.

IP address field 415 comprises information associated with a location or address of a terminal from which a user has accessed the information or requested execution of the task.

Task field 420 indicates a task corresponding to the request to execute a task. The task indicated in the task field 420 corresponds to a high level task (e.g., a task for which parameters are included to execute the task/run the query). For example, the task corresponds to a dataset or type of information against which the query is run.

Target information field 425 includes information indicating a target of the execution of the task/query. For example, the target is a parameter of the request to execute the task. The target is a person/user of a tenant, a set of information, or one or more characteristics that are used to filter a superset of information associated with the task. As an example, in the case that the task is a query, the information comprised in target information field 425 comprises one or more values for fields or parameters used to define or restrict the query. As another example, target information field 425 indicates a database table that is subject to a query. As another example, target information field 425 indicates an object class or object attribute that is subject to a query.

Subject information field 430 comprises an indication of subject information that has been exposed to the user in response to execution of the task. In some embodiments, subject information field 430 comprises an indication of a particular piece of subject information that has been exposed to the user, or a type of subject information that has been exposed to the user, or both. According to various embodiments, subject information corresponds to sensitive information pertaining to a tenant, including PII of a person or a user associated with the tenant, proprietary information pertaining to the tenant, etc. As an example, PII of a person or a user associated with the tenant such as a particular target user or a set of target users for a query (e.g., a profile associated with the target user). As another example, proprietary information pertaining to the tenant includes a particular piece or set of tenant sensitive information (e.g., a business plan with respect to a new product, a trade secret, a product, a research program, an employee). As an example, in the case that the subject information corresponds to PII of a person or user(s) associated with a tenant, the subject field 430 comprises an indication of persons or users for which information has been exposed to the user in response to execution of the task. The indication that a type of subject information has been exposed to the user can include an indication that the subject information was PII, financial data, research and development data, intellectual property, etc. As another example, in the case that the subject information corresponds to proprietary information pertaining to the tenant, the subject field 430 comprises an indication of a type of information or a particular piece of information that has been exposed to the user in response to execution of the task (e.g., a particular piece of tenant sensitive information, a PII of a person or user for which information is exposed, etc.). As an example, as illustrated in second row of log 400, subject information field 430 indicates that information pertaining to Jane Doe has been accessed (e.g., information pertaining to Jane Doe was returned in connection with execution of the corresponding task). As another example, as illustrated in the second row of log 400, subject information field 430 indicates that information pertaining to Jane Smith, Jane Doe, and John Doe has been accessed (e.g., information pertaining to such persons was returned in connection with execution of the corresponding task). In some embodiments, the subject information field 430 is used to indicate users or persons for which PII was returned in response to execution of the corresponding task. In some embodiments, the subject information field 430 is used to record/indicate certain tenant sensitive information that was returned to the user in response to execution of the corresponding task. As an example, in connection with information in a trade secret database/log being exposed to the user, the system records in subject field for the record or the transaction an indication of the particular trade secret exposed to the user (e.g., a project name associated with the trade secret, etc.). As an example, in connection with information pertaining to an R&D project (e.g., project "Alpha") being exposed to the user, the system records in subject field for the record or the transaction an indication of the particular information exposed to the user (e.g., a design history file for component X of project Alpha, test results for component Y of project Alpha, etc.).

Activity category field 435 comprises an indication of a type of activity or action performed in connection with the execution of the task. Examples of the type of activity include read, write, delete, copy, download, other (e.g., security access denied requests, file not found requests, etc.), etc.

According to various embodiments, log 400 provides information in a manner that restricts information provided to the permitted user based on the access permissions of the permitted user. As an example, log 400 points to information (e.g., information that has been returned the user in response to execution of the task) but does not store the subset of the set of information returned to the user in response to the request to execute the task with respect to the database. Log 400 comprises a link (e.g., a hyperlink) via which the permitted user can attempt access the underlying information that was returned to the user in connection with executing the task. As example, log 400 comprises selectable link 445 that is linked to information pertaining to the employee Jane Doe, the CFO of the organization. Accordingly, specific PII pertaining to Jane Doe is not displayed when log 400 is viewed/searched, however, the system points to underlying information pertaining to Jane Doe that is accessed by selection from the permitted user. In some embodiments, at least part of log 400 is provided to another user (e.g., an administrator, etc.), the log being provided in a manner that provides a selectable link (e.g., selectable link 440 or selectable link 445, etc.) to at least part of the subset of the set of information to which the log points. In response to receiving an input to select the selectable link, the system or method (e.g., a security or authentication module) determines whether the other user is permitted to access information to which the selectable link points. For example, in response to selection of selectable link 445 pointing to information for Jane Doe, or selectable link 440 pointing to a compensation spreadsheet, a determination of whether the task (e.g., viewing/accessing the underlying information) is permitted for the user that selected the corresponding selectable link (e.g., selectable link 440 or selectable link. In response to a determination that the other user is permitted to access the information 445) to which the selectable link points, the other user is permitted to the access information to which the selectable link points. For example, the system causes the user interface at the client terminal to display information/report corresponding to such underlying information.

Figure 5:
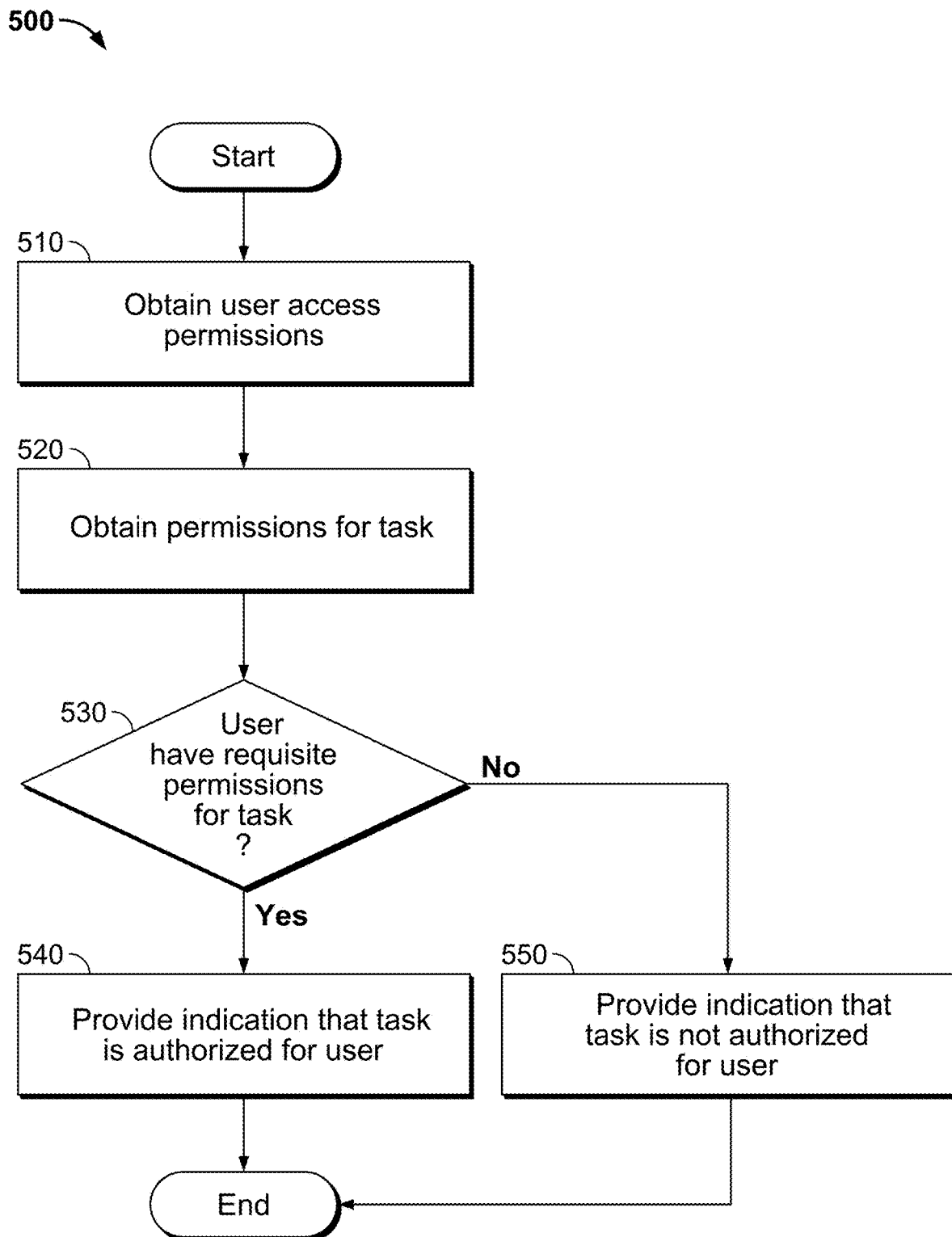
FIG. 5 is a flow diagram of a method for logging user activity with respect to a database system according to various embodiments of the present application.

FIG. 5 is a flow diagram of a method for logging user activity with respect to a database system according to various embodiments of the present application. According to various embodiments, process 500 is implemented in connection with 320 of process 300 of FIG. 3. Process 500 is implemented by a security subsystem of a system that manages one or more datasets and/or a software as a service. For example, process 500 is implemented by security subsystem 135 of system 100 of FIG. 1.

At 510, user access permissions are obtained. In some embodiments, the user access permissions are obtained from a mapping of permissions to users. In some embodiments, the access permissions are obtained from a profile or user definition corresponding to the user (e.g., the user that requested the execution of the task). The user access permissions are defined on a user-by-user basis (e.g., based on a user identifier), a role-by-role basis (e.g., whether a user is a manager, an executive, a legal member, etc.), a department-by-department basis (e.g., whether a user is in the legal department, the executive team, the research and development department, a human resources department, etc.), etc. Other permissions sets or classifications for users (e.g., attributes for the user) may be used to set permissions or otherwise defined permission sets for a user.

At 520, permissions for a task are obtained. The permissions for the task correspond to permissions required in order to request execution of the task, or permissions required in order to obtain results from execution of the task. In some embodiments, the permissions for the task. The permissions for the task are obtained from a mapping of permissions to tasks. For example, the permissions for a task are defined on a user-by-user basis (e.g., based on a user identifier), a role-by-role basis (e.g., whether a user is a manager, an executive, a legal member, etc.), a department-by-department basis (e.g., whether a user is in the legal department, the executive team, the research and development department, a human resources department, etc.), etc. Other permissions sets or classifications for users (e.g., attributes for the user) are used to set permissions or otherwise defined permission sets for a user.

At 530, a determination of whether a user has requisite permissions for the task is performed. In some embodiments, the system determines whether the user access permissions match (e.g., are consistent with) the permissions for the task.

In response to a determination that the user has requisite permissions for the task at 530, process 500 proceeds to 540 at which an indication that the task is authorized for the user is provided. In some embodiments, the indication that the task is authorized for the user is provided to process 300 of FIG. 3.

In response to a determination that the user has requisite permissions for the task at 530, process 500 proceeds to 550 at which an indication that the task is not authorized for the user is provided. In some embodiments, the indication that the task is authorized for the user is provided to process 300 of FIG. 3.

Figure 6:
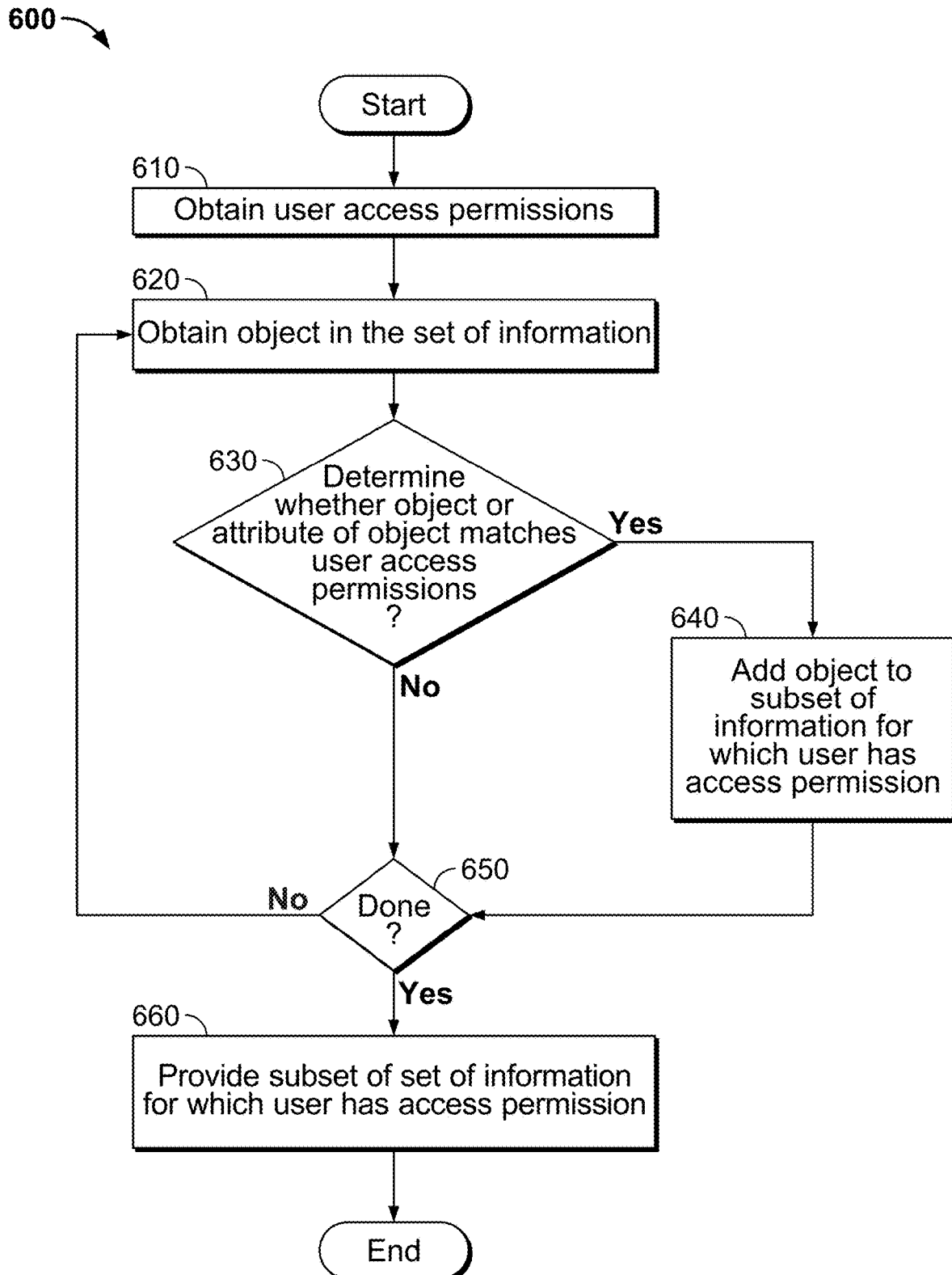
FIG. 6 is a flow diagram of a method for logging user activity with respect to a database system according to various embodiments of the present application.

FIG. 6 is a flow diagram of a method for logging user activity with respect to a database system according to various embodiments of the present application. According to various embodiments, process 600 is implemented in connection with 350 of process 300 of FIG. 3. Process 600 is implemented by a security subsystem of a system that manages one or more datasets and/or a software as a service. For example, process 500 is implemented by security subsystem 135 of system 100 of FIG. 1.

At 610, user access permissions are obtained. In some embodiments, the user access permissions are obtained from a mapping of permissions to users. In some embodiments, the access permissions are obtained from a profile or user definition corresponding to the user (e.g., the user that requested the execution of the task). The user access permissions are defined on a user-by-user basis (e.g., based on a user identifier), a role-by-role basis (e.g., whether a user is a manager, an executive, a legal member, etc.), a department-by-department basis (e.g., whether a user is in the legal department, the executive team, the research and development department, a human resources department, etc.), etc. Other permissions sets or classifications for users (e.g., attributes for the user) are used to set permissions or otherwise defined permission sets for a user. The user access permissions indicate a set of classes of objects or object attributes for which the user has permission to access.

At 620, an object in the set of information is obtained. In some embodiments, the one or more datasets with respect to which the task is executed (e.g., the dataset(s) against which the query is run) comprise a plurality of objects. For example, the plurality of objects respectively correspond to a piece of information of the one or more datasets. Each object within the one or more datasets have a corresponding unique object identifier. In some embodiments, each object are associated with a set of attributes that specify the structure the object.

At 630, a determination whether the object or an attribute of the object matches the user access permissions. In some embodiments, a security subsystem such as security system 135 determines whether an object corresponding to the information (e.g., to a piece of information or to a plurality of pieces of information) comprises, or is associated with, an attribute, class, or information indicating that the user has permission to access such object. For example, the system determines whether the object comprises, or is associated with, an attribute, class, or information that matches the user access permissions (e.g., for which the user has access permissions).

In response to a determination that the object or an attribute of the object matches the user access permissions at 630, process 600 proceeds to 640 at which the object is added to a subset of information for which the user has access permission. Process 600 then proceeds to 650.

In response to a determination that the object or an attribute of the object does not match the user access permissions at 630, process 600 proceeds to 650.

At 650, the system determines whether the set of information comprises further objects for which a determination of whether the object or attribute of the object matches the user access permissions. For example, process 600 iteratively determines, for each object in the set of information (e.g., information responsive to the query, information resulting from execution of the task, etc.), whether the user permissions match the permissions associated with the object (e.g., whether the object has an attribute matching the user or user permissions). The subset of information that is provided to the user in response to execution of the task is built out (e.g., determined) based on the iterative determine of matching user-object permissions.

In response to determining that the set of information comprises further objects for which a determination of whether the object or attribute of the object matches the user access permissions at 650, process 600 may return to 620.

In response to determining the set of information does not comprise further objects for which a determination of whether the object or attribute of the object matches the user access permissions at 650, process 600 may proceed to 660 at which the subset of the set of information for which the user has access permissions are provided. For example, the subset of the set of information is returned to 350 of process 300 of FIG. 3.

Figure 7:
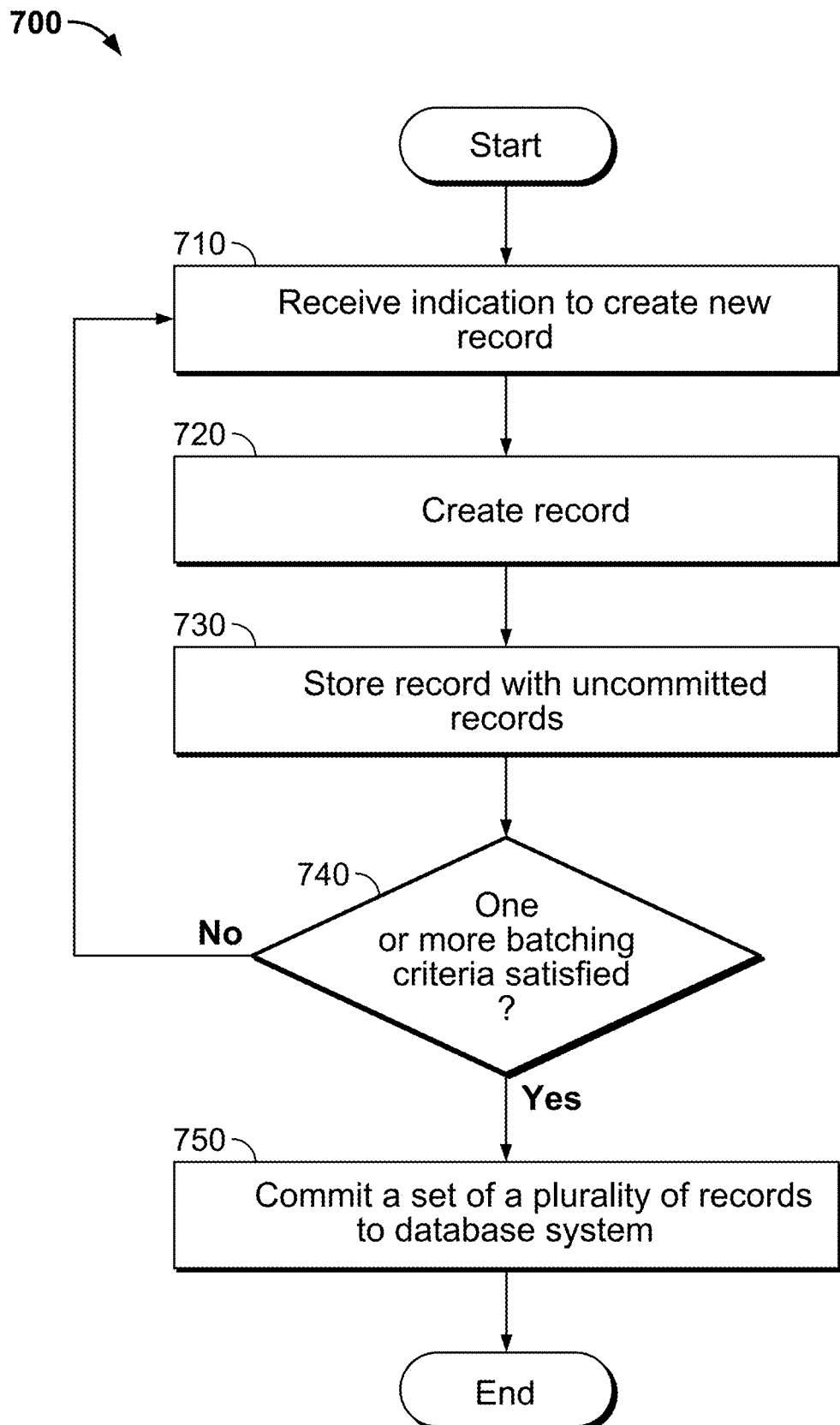
FIG. 7 is a flow diagram of a method for logging user activity with respect to a database system according to various embodiments of the present application.

FIG. 7 is a flow diagram of a method for logging user activity with respect to a database system according to various embodiments of the present application. According to various embodiments, process 700 is implemented in connection with 360 of process 300 of FIG. 3. Process 700 is implemented by a security subsystem of a system that manages one or more datasets and/or software as a service. For example, process 500 is implemented by security subsystem 135 of system 100 of FIG. 1.

At 710, an indication to create a new record is received. In some embodiments, the indication to create the new record is received in connection with receiving a request to execute a task. As an example, a record corresponds to a row in the log of user activity such as log 400. The record includes information for one or more fields of the log of user activity. In some embodiments, the indication to create the new record is received in response to a determination of the subset of the set of information responsive to the task execution/query, the subset corresponding to information that the user has access permission among the set of information. In some embodiments, in response to determining the subset of information to be returned or provided to the user, the system determines to create the new record. In some embodiments, in response to (or in connection with) providing the results pertaining to the task (e.g., the subset of information).

At 720, a record is created. For example, the system creates the record based at least in part on the request to execute the task and/or results determined based at least in part on the execution of the task. According to various embodiments, a record comprised in the log is immutable.

In some embodiments, the record comprises one or more predefined fields that is configurable such as by an administrator or tenant associated with the one or more datasets. Examples of the one or more predefined fields include, without limitation, a date and/or time when a task was executed, an indication of a user associated with the request to execute the task (e.g., a user identifier such as an employee number, a user name, an email address, a login identifier, etc.), an IP address from which the request to execute the task is received, an identifier of the terminal from which the request to execute the task is received, an indication of the type of task, an indication of a target of type of information (e.g., a department associated with the information that may have been returned, a category or sub-organization in which the information may have been returned, a type of report requested, a parameter or value associated with a variable used in connection with the query or execution of the task, etc.), a subject of the information that has been returned (e.g., a person such as an executive that for which corresponding information has been returned, etc.), a type of activity executed (e.g., a read, a write, a delete, etc.). Various other types of information is implemented as a predefined field.

At 730, the record is stored in a set of uncommitted records. In some embodiments, the system (e.g., a security subsystem such as security system 135 of system 100) stores the record in a logging queue. The logging queue comprises a set of uncommitted records (e.g., records that have not yet been committed or stored in the log). The record is stored in the logging queue contemporaneous with execution of the task (or contemporaneous with a request to execute the task).

At 740, a determination of whether one or more batching criteria are satisfied is performed. The system determines whether to commit a record in the logging queue based on a satisfaction of one or more batching criteria. Examples of the batching criteria include, without limitation, a threshold number of records in the logging queue (e.g., a threshold number of records that have not yet been committed to the log), a time that has elapsed since a last commitment of records to the log, a date and/or time, a detection of anomalous behavior based on an analysis of records in the log, a detection of anomalous behavior based at least in part on an analysis of records in the logging queue, etc.

In some embodiments, in response to a determination that a logging queue comprises a number of records equal to or greater than the threshold number of records, the batching criterion is deemed satisfied. In some embodiments, in response to a determination that a threshold amount of time has elapsed since a last commitment of records in the logging queue, the batching criterion is deemed satisfied. Various other criteria are implemented as the one or more batching criteria.

In response to a determination that the one or more batching criteria are satisfied at 740, process 700 proceeds to 750 at which a set of a plurality of records is committed to a database system. In some embodiments, the commitment of the set of the plurality of records to the database system comprises storing the set of the plurality of records in the log. The storing of the set of the plurality of records in the log comprises updating the log to include the set of the plurality of records. The log is stored in association with the one or more datasets. For example, the log is stored in the database system 105 of system 100 of FIG. 1. The commitment of the set of the plurality of records as a batch (e.g., in contrast to commitment of a record as it is generated) improves or optimizes a cost to post logging information pertaining to subject information associated with a request to execute a task (e.g., a cost to post a record of a task). In some embodiments, the one or more batching criteria is configured based on a cost function and/or optimization of the commitment of records to a log (e.g., to satisfy one or more cost value thresholds of a cost function associated with committing one or more records to a log and servicing queries and tasks from other users with respect to the one or more datasets).

Figure 8:
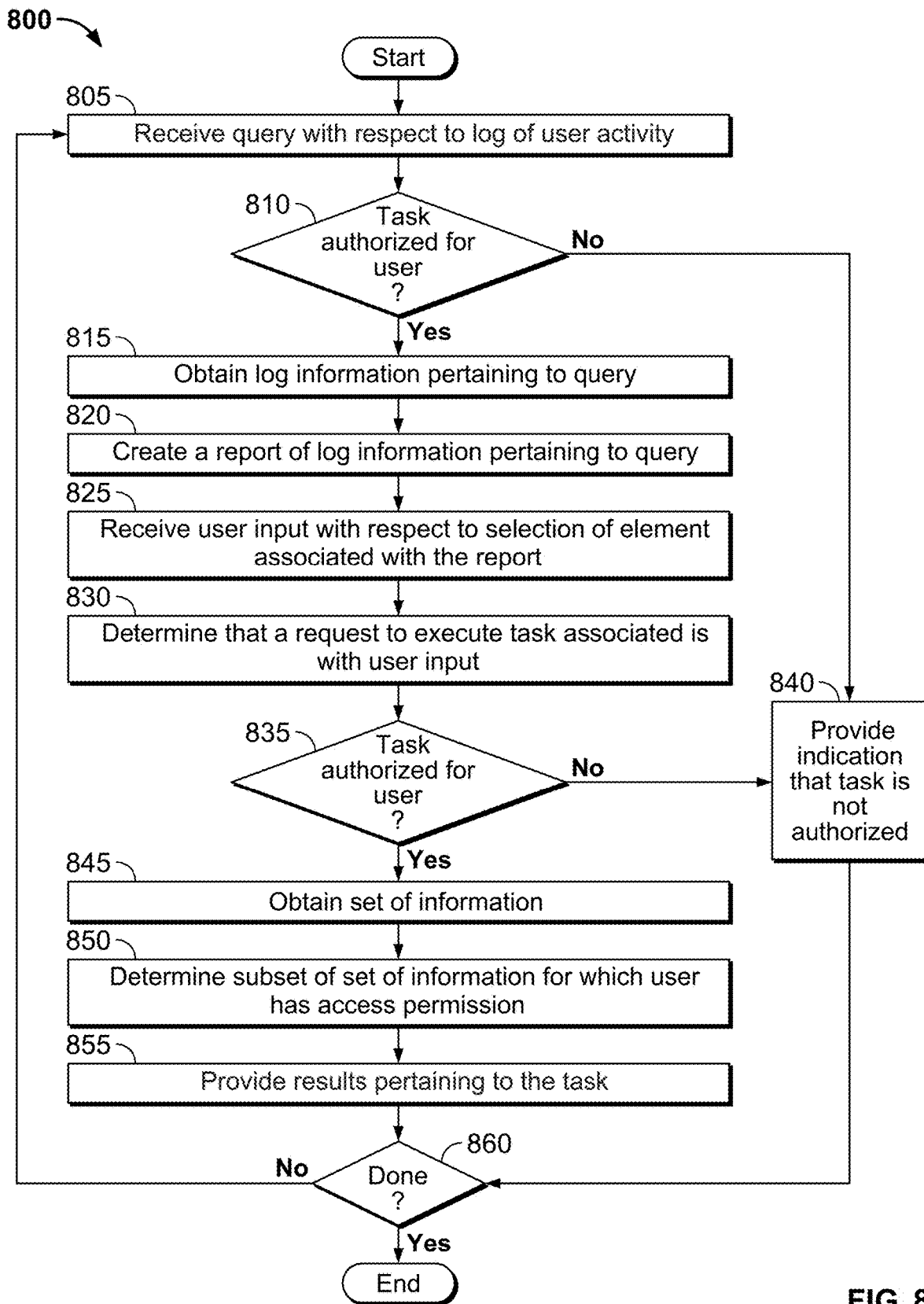
FIG. 8 is a flow diagram of a method for querying a log of user activity with respect to a database according to various embodiments.

FIG. 8 is a flow diagram of a method for querying a log of user activity with respect to a database according to various embodiments. According to various embodiments, the log is searchable with respect to subject information that has been exposed to a user in connection with execution of a task. In some embodiments, subject information corresponds to sensitive information pertaining to a tenant, including PII of a person or a user associated with the tenant, proprietary information pertaining to the tenant, etc. As an example, PII of a person or a user associated with the tenant such as a particular target user or a set of target users for a query (e.g., a profile associated with the target user). As another example, proprietary information pertaining to the tenant includes a particular piece or set of tenant sensitive information (e.g., a business plan with respect to a new product, a trade secret, a product, a research program, an employee). The recording of information pertaining to a user query and/or subject information in connection with execution of a task provides greater context in the recording of user activity. For example, the log according to various embodiments provides information indicating information that has been exposed to a user (e.g., returned to the user as a result to a query), rather than a mere indication of a query that was performed which would require restoration of data as of the date and/or time of the query, re-performing the query, and obtaining the results. Because the log is searchable and/or indexed according to one or more predefined fields that provide context for the record or the task that was executed, permitted users such as administrators or other users with permissions to view and/or use the log are able to efficiently and effectively analyze a user's historical activity, and systems are able to detect anomalous behavior in a timely manner.

At 805, a query with respect to a log of user activity is received. According to various embodiments, the log is searchable such as by a permitted user such as an administrative user (e.g., an administrator of a tenant associated with the corresponding one or more datasets) and/or other user with requisite permissions such as access permissions to read/view the log, etc. In some embodiments, a user inputs the query (e.g., query parameters for the query) to a client terminal such as a user interface provided by the client terminal (e.g., user system 120 and/or administrator system 125 of system 100, etc.).

According to various embodiments, the query comprises one or more query parameters. The one or more query parameters include(s) a value corresponding to one or more fields of the log. For example, the one or more query parameters includes an indication one or more of a user, a subject or subject information, a date and/or time (e.g., the date or time when the task was requested and/or executed), an identifier associated with a terminal from which the task was requested (e.g., an IP address, a MAC address, etc.), an indication of target information, an activity category, etc. According to various embodiments, the one or more query parameters include any combination of the foregoing or the like.

At 810, a determination of whether the task is authorized for the user is performed. In some embodiments, in response to receiving the request to execute the task, the system determines whether the task is authorized for the user (e.g., whether the user has the requisite permissions to execute the task). The determination of whether the task is authorized for the user is performed by an authentication or security system (e.g., a security subsystem) such as security system 135 of system 100 of FIG. 1. In some embodiments, the determination of whether the task is authorized for the user may be based at least in part on a set of permissions associated with the user (e.g., an account of the user, a role of the user, an attribute of the user, etc.). For example, the determination of whether the task is authorized for the user may be based at least in part on a mapping of user permissions to tasks (e.g., a permission to query/search a log of user activity).

In response to a determination that the task is not authorized for the user at 810, process 800 proceeds to 840 at which an indication that the task is not authorized for the user is provided. The system communicates to a client terminal, such as user system 120 of system 100 of FIG. 1, the indication that the task is not authorized for the user is provided. For example, the system causes the client terminal to display a prompt or indication that the requested task is not permitted. Process 800 then proceeds to 860.

In response to a determination that the task is authorized for the user at 810, process 800 proceeds to 815 at which log information pertaining to the query is obtained. Obtaining the log information pertaining to the query includes determining information that is responsive to the query. For example, the query is run against one or more datasets associated with the query to obtain the log information pertaining to the query. The log information pertaining to the query is determined based at least in part on one or more parameters comprised in (or communicated in connection with) the query.

At 820, a report of log information pertaining to the query is created. In some embodiments, the creating the report comprises populating a report template with at least the log information pertaining to the query. The report template is configured based at least in part on one or more of the query, the one or more parameters associated with the query, and the log information pertaining to the query.

The report is provided in response to the query. For example, the system causes the client terminal to display the report. For example, the system configures the user interface displayed on the client terminal, such as a page in a web browser, to display the report.

According to various embodiments, the log information pertaining to the query provides information in a manner that restricts information provided to the permitted user based on the access permissions of the permitted user. As an example, the log information pertaining to the query points to information (e.g., information that has been returned the user in response to execution of the task) but does not display the subset of the set of information returned to the user in response to the request to execute the task with respect to the database. The log information pertaining to the query that is provided to the user comprises a link (e.g., a hyperlink) via which the permitted user attempts to access the underlying information that has been returned to the user in connection with executing the task. As example, the selectable link used in connection with providing the log information pertaining to the query corresponds to selectable link 445 of log 400 of FIG. 4, according to which the selectable link is linked to information pertaining to the employee Jane Doe, the CFO of the organization. Accordingly, specific PII pertaining to Jane Doe is not displayed when log 400 is viewed/searched, however, the system points to underlying information pertaining to Jane Doe that is accessed by selection from the permitted user. In some embodiments, the report may correspond to a filtered version the log such as log 400. The filtered version of the log returns only records matching (e.g., responsive to) the query.

At 825, a user input with respect to a selection of an element associated with the report is received. In some embodiments, the user input is received at a client terminal (e.g., user system 120, administrator system 125, user system 130, etc.), the client terminal communicates the user input (or indication thereof) to the system (e.g., security system 135, etc.), and the security system receives the user input. The user input is communicated to the system (e.g., security system 135, etc.). As an example, in response to receiving a selection of a user input, a request to execute the task may be generated (e.g., by the client terminal, etc.) and communicated to the system (e.g., security system 135, etc.).

As another example, in response to receiving a selection of a user input, the client terminal communicates an indication of the user input.

At 830, the user input is determined to be associated with a request to execute a task. According to various embodiments, in response to receiving the user input, the system determines that the user input corresponds to a user selection to execute a task. For example, in response to receiving a user input correspond to selection of a selectable link, the system determines that the user requests to execute a task to access information corresponding to the selectable link (e.g., information to which the selectable link points). In the example of selectable link 445 of log 400 of FIG. 4, selection of the selectable link corresponds to a request to view information pertaining to Jane Doe, CFO (e.g., to view a user profile corresponding to Jane Doe, to view PII of Jane Doe, etc.).

At 835, a determination of whether the task is authorized for the user (e.g., the permitted user that is viewing/using the log) is performed. In some embodiments, in response to receiving the request to execute the task, the system determines whether the task is authorized for the user (e.g., whether the user has the requisite permissions to execute the task). The determination of whether the task is authorized for the user is performed by an authentication or security system (e.g., a security subsystem) such as security system 135 of system 100 of FIG. 1. In some embodiments, the determination of whether the task is authorized for the user is based at least in part on a set of permissions associated with the user (e.g., an account of the user, a role of the user, an attribute of the user, etc.). For example, the determination of whether the task is authorized for the user is based at least in part on a mapping of user permissions to tasks (e.g., a permission to query/search a log of user activity). As another example, the system determines whether the user viewing the log (or report pertaining to the log of user activity) has access permissions to execute the task, such as viewing the information underlying the selectable link (e.g., the information that was returned to the user corresponding to the associated record in the log).

In response to a determination that the task is not authorized for the user at 835, process 800 proceeds to 840 at which an indication that the task is not authorized for the user is provided. The system communicates to a client terminal, such as user system 120 of system 100 of FIG. 1, the indication that the task is not authorized for the user is provided. For example, the system causes the client terminal to display a prompt or indication that the requested task is not permitted. Process 800 then proceeds to 860.

In response to a determination that the task is authorized for the user at 835, process 800 may proceed to 845 at which a set of information is obtained. The set of information corresponds to information that is responsive to the request to execute a task associated with the user input. For example, in response to the user selecting a selectable element that pointed to underlying information (e.g., a selectable link of a user profile, such as a profile of Jane Doe in response to selection of selectable element 445, etc.), the system generates a task/query to access the underlying information, and executes the task/query to obtain the underlying information (e.g., the information comprised in the user profile such as PII of the user).

At 850, a subset of the set of information for which the user has access permissions is determined. In response to the set of information being obtained, the system determines a subset of such set of information. The subset is determined based on a determination of which of the set of information (e.g., the results of the task such as information responsive to a query) the user has access permissions. In some embodiments, a security subsystem such as security system 135 determines whether a user has permission to access information based at least in part on a mapping of user permissions to information. In some embodiments, a security subsystem such as security system 135 determines whether a user has permission to access information based at least in part on a determination that an object corresponding to the information (e.g., to a piece of information or to a plurality of pieces of information) comprises an attribute or information indicating that the user has permission to access such object. The subset of the set of information for which the user has access permission(s) corresponds to information to which the user is exposed in connection with executing the task.

At 855, results pertaining to the task are provided. For example, the providing of the results pertaining to the task is performed contemporaneously with the storing of the record of the request to execute the task. In some embodiments, the results pertaining to the task are provided in a report or in connection with populating a predefined or configurable template. According to various embodiments, the results pertaining to the task correspond to the subset of the set of information (e.g., the information responsive to a query) for which the user has access permission. The system causes a user interface of a client terminal to provide the results pertaining to the tasks, such as by causing the user interface to display a report comprising the subset of the set of information.

At 860, a determination is made as to whether 800 is complete. In some embodiments, process 800 is determined to be complete in response to a determination that the user has indicated that no further queries or tasks are to be executed, the user has exited the system, an administrator indicates that process 800 is to be paused or stopped, and/or anomalous behavior (e.g., anomalous user activity) is detected. In response to a determination that process 800 is complete, process 800 ends. In response to a determination that process 800 is not complete, process 800 returns to 805.

Figure 9:
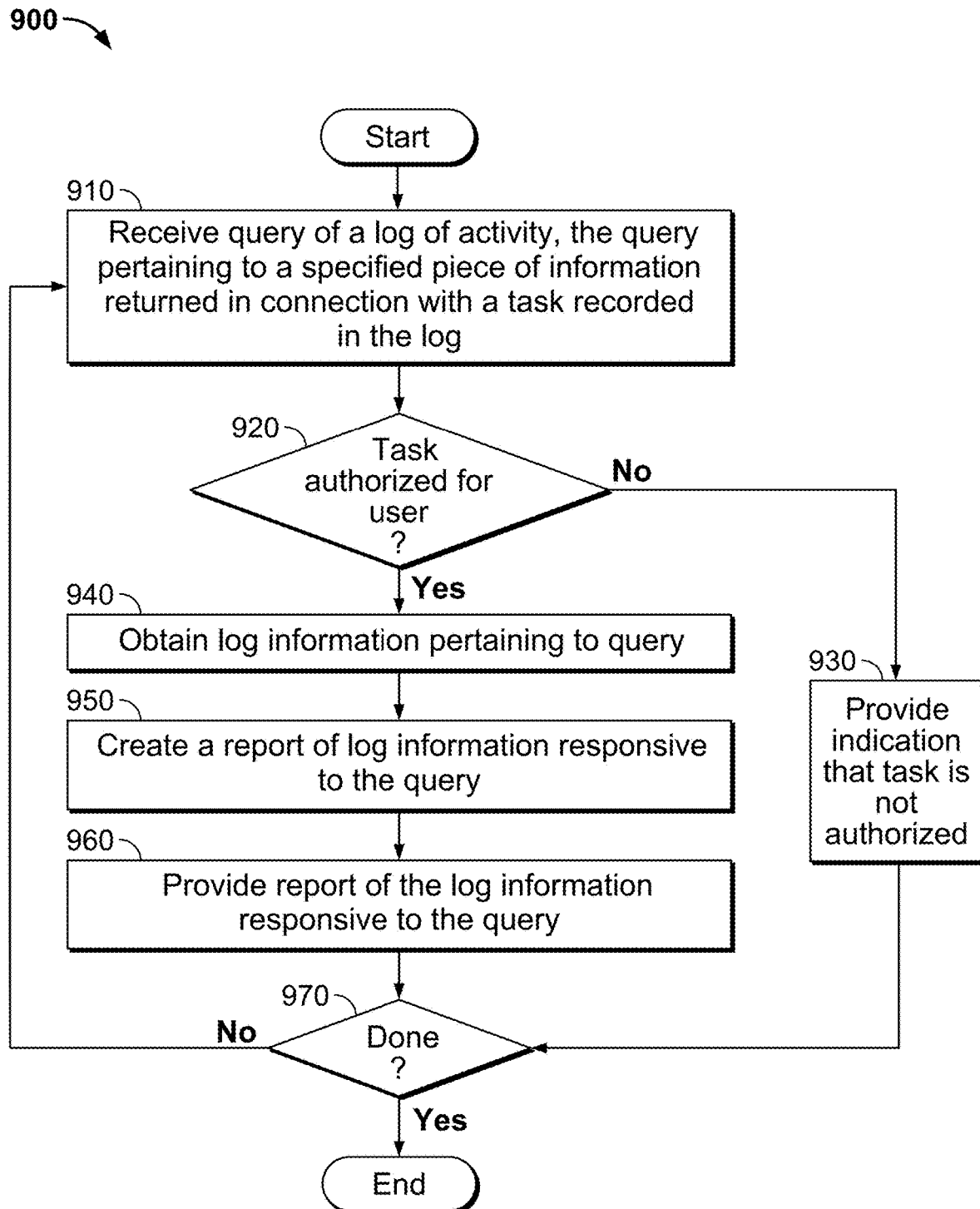
FIG. 9 is a flow diagram of a method for querying a log of user activity with respect to a database according to various embodiments.

FIG. 9 is a flow diagram of a method for querying a log of user activity with respect to a database according to various embodiments. In some embodiments, the log is searchable by a permitted user of the database system. In some embodiments, the log points to information but does not store the subset of the set of information returned to the user in response to the request to execute the task with respect to the database.

According to various embodiments, the system provides at least part of the log to another user, the log being provided in a manner that provides a selectable link to at least part of the subset of the set of information to which the log points. In response to receiving an input to select the selectable link, the system (e.g., the security system) determines whether the other user is permitted to access information to which the selectable link points. In response to a determination that the other user is permitted to access the information to which the selectable link points, the system provides to the other user the access information to which the selectable link points. In some embodiments, the permitted user queries the log based at least in part on an identifier of a user. In some embodiments, the permitted user queries the log based at least in part on an identifier associated with the information returned with respect to one or more tasks for which a record is stored in the log. In some embodiments, the permitted user queries the log based at least in part on a type of information returned to the user in response to the request to execute the task.

At 910, a query of a log of activity is received. In some embodiments, the query pertains to a specified piece of information returned in connection with a task recorded in the log. The query of the log activity is received from a user such as an administrator or another user auditing user activity. As an example, the query of a log activity corresponds to a query of a particular user's (or set of users) activity. As another example, the query of a log activity corresponds to a query of tasks that returned information associated with a particular user (e.g., an executive of a tenant, etc.). For example, the administrator may seek to determine which users viewed information pertaining to a particular person (e.g., the executive). In some embodiments, the query comprises one or more parameters pertaining to a date and/or time associated with the user activity. For example, the administrator seeks to determine which users have been exposed to or had access to subject information such as a particular piece of information (e.g., executive compensation, a person's PII, information about an executive, a particular trade secret record, a particular business plan or research results, etc.) within a certain period of time. According to various embodiments, a record comprised in the log is immutable. As an example, the log comprises a secure and consistent record of user activity with respect to tenant sensitive information stored in the one or more underlying datasets.

At 920, a determination of whether the task is authorized for the user is performed. For example, the system determines whether the user associated with the task is a permitted user such as an administrator or other user with permissions to view and/or use the log. In some embodiments, in response to receiving the request to execute the task, the system determines whether the task is authorized for the user (e.g., whether the user has the requisite permissions to execute the task). The determination of whether the task is authorized for the user is performed by an authentication or security system (e.g., a security subsystem) such as security system 135 of system 100 of FIG. 1. In some embodiments, the determination of whether the task is authorized for the user is based at least in part on a set of permissions associated with the user (e.g., an account of the user, a role of the user, an attribute of the user, etc.). For example, the determination of whether the task is authorized for the user is based at least in part on a mapping of user permissions to tasks (e.g., a permission to query/search a log of user activity). As another example, the system determines whether the user viewing the log (or report pertaining to the log of user activity) has access permissions to execute the task, such as viewing the information underlying the selectable link (e.g., the information that was returned to the user corresponding to the associated record in the log).

In response to a determination that the task is not authorized for the user at 920, process 900 proceeds to 930 at which an indication that the task is not authorized for the user is provided. The system communicates to a client terminal, such as user system 120 of system 100 of FIG. 1, the indication that the task is not authorized for the user is provided. For example, the system causes the client terminal to display a prompt or indication that the requested task is not permitted. Process 900 then proceeds to 970.

In response to a determination that the task is authorized for the user at 920, process 900 proceeds to 940 at which log information pertaining to the query is obtained. The set of information corresponds to information that is responsive to the request to execute a task associated with the user input. For example, in response to the user selecting a selectable element that pointed to underlying information (e.g., a selectable link of a user profile, such as a profile of Jane Doe in response to selection of selectable element 445, etc.), the system generates a task/query to access the underlying information, and executes the task/query to obtain the underlying information (e.g., the information comprised in the user profile such as PII of the user).

At 950, a report of log information responsive to the query is created. In some embodiments, the report of log information responsive to the query is generated based at least in part on a predefined template. The predefined template is configured based at least in part on parameters associated with the task (e.g., query). For example, the report template is configured to include one or more certain fields based at least in part on one or more parameters of the query. As another example, the report is configured to exclude one or more certain fields based at least in part on one or more parameters of the query (e.g., a field that is not relevant to the query may be excluded, etc.).

At 960, a report of log information responsive to the query is provided. In some embodiments, the report of log information responsive to the query is provided to a user (e.g., via a client terminal such as user system 120, administrator system 125, and/or user system 130). As an example, the system (e.g., database system 105, security system 135, etc.) causes the user interface of the client terminal to display the report or information comprised in the report.

At 970, a determination is made as to whether 900 is complete. In some embodiments, process 900 is determined to be complete in response to a determination that the user has indicated that no further queries or tasks are to be executed, the user has exited the system, an administrator indicates that process 900 is to be paused or stopped, and/or anomalous behavior (e.g., anomalous user activity) is detected. In response to a determination that process 900 is complete, process 900 ends. In response to a determination that process 900 is not complete, process 900 returns to 910.

Figure 10:
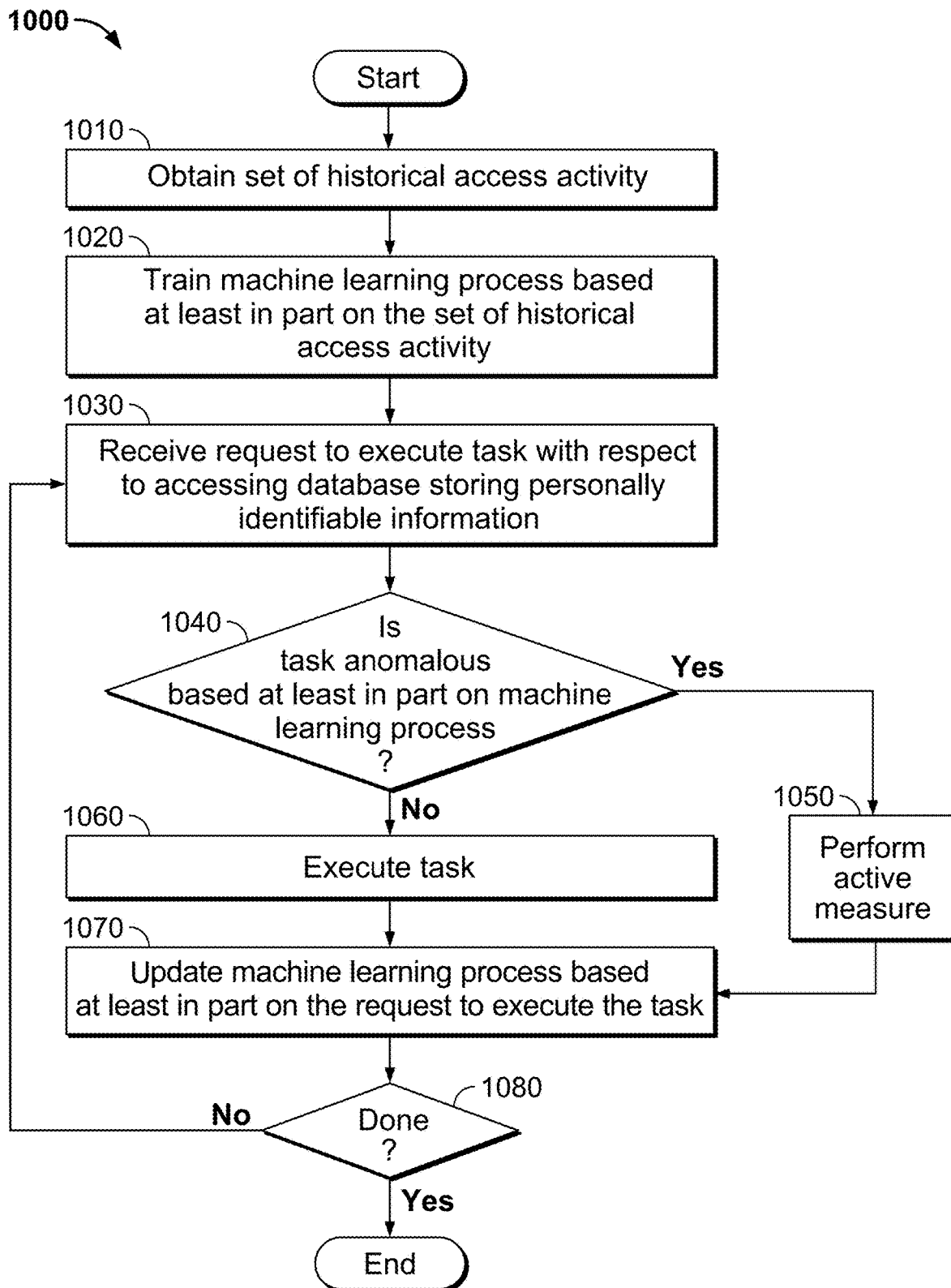
FIG. 10 is a flow diagram of a method for detecting anomalous user activity with respect to accessing a database system.

FIG. 10 is a flow diagram of a method for detecting anomalous user activity with respect to accessing a database system. According to various embodiments, a recording or logging of user activity is used in connection with detecting anomalous user activity.

At 1010, a set of historical access activity is obtained. In some embodiments, the set of historical access activity corresponds to activity with respect to one or more datasets for a particular tenant. In some embodiments, the set of historical access activity may correspond to activity across a plurality of tenants. The set of historical access activity comprises records of user activity (e.g., user queries, requests to execute tasks, type of information exposed to or accessed by a user, etc.). The set of historical activity comprises context data pertaining to a record (e.g., a location, time, date, role of the user, etc.).

At 1020, a machine learning process is trained based at least in part on the set of historical access activity. In some embodiments, the training of the machine learning process trains the machine learning process with respect to defining normal user activity with respect to a dataset (e.g., a dataset of a particular tenant, etc.). Alternatively or additionally, the training of the machine learning process trains the machine learning process with respect to defining abnormal or anomalous user activity with respect to a dataset. For example, a set of user activity predefined to correspond to an abnormal or anomalous are used to train the machine learning process to define abnormal or anomalous user activity.

At 1030, a request to execute a task is received. In some embodiments, the request to execute the task comprises a request to access a database storing PII or tenant sensitive information. In some embodiments, the request to execute the task comprises a request to access PII for another user (e.g., a person associated with a tenant). In some embodiments, the request to execute the task comprises a request to access tenant sensitive information (In some embodiments, the request to execute the task is received from a user, such as via a user input to a client terminal. For example, the request to execute the task is input by the user to user system 120 and/or user system 130. As another example, the request to execute the task is input by an administrator to administrator system 125. As another example, the request to execute the task is initiated automatically on behalf of a user such as in connection with providing a dashboard or other user interface provided to the user (e.g., a dashboard report such as a report indicating a number of vacation days submitted for employees in an organization with which the user is associated). The request to execute the task can be received in response to a determination that the dashboard or other user interface to be provided to the user is to be refreshed, such as in accordance with a predefined schedule or refreshing frequency. The request to execute the task can be received in response to a determination that the system is to automatically provide to the user information such as information determined to be interesting (e.g., information that is determined to be an outlier or statistically relevant, information that the system infers the user would like to receive such as based on a time of day, month, year, etc., information collected as a story for the user such as information that provides an indication or summary of trends, etc.).

As an example, the request to execute a task comprises a request to view a user profile corresponding to a target user associated with the tenant. The user profile stores PII of the target user, such as role, address, compensation, etc. As another example, the request to execute the task comprises a request to view a trade secret log associated with the tenant. The trade secret log can store information pertaining to trade secrets associated with products or processes of the tenant, or financial information such as costs, margins, etc. As another example, the request to execute a task comprises a request to review a design of a product or part of a product. The design of a product or a part of a product can comprise a design history file, etc. In some embodiments, designs of products, etc. are tenant sensitive information. As another example, the request to execute a task comprises a request to review financial information associated with a tenant.

The request to execute the task comprises one or more parameters pertaining to the task. As an example, in the case that the task is a query, the one or more parameters comprise (s) a query string, etc. The one or more parameters pertaining to the task includes a task definition (e.g., a query string), an indication of the database (e.g., one or more datasets) with which the task is to be executed, etc. In some embodiments, the request to execute the task includes identifying information such as information that identifies a user or terminal from which the request to execute the task is received (e.g., a user identifier, a login name, an email address, an IP address, a MAC address, a terminal identifier, etc.), and/or a credential associated with the user or terminal. As an example, in the case of the request to execute the task being initiated automatically on behalf of a user, the system authenticates the user on behalf of whom the request to execute the task is automatically initiated. For example, the request to execute the task includes a credential (e.g., a login identifier and/or password) associated with the user.

At 1040, a determination of whether the task is anomalous is made. In some embodiments, the system determines whether the task is anomalous based at least in part on the machine learning process. For example, the machine learning process is used to determine whether the task is within the definition of normal user activity or whether the task is within the definition of abnormal user activity. The determination of whether the task is anomalous is based at least in part on the task, the user requesting the task, and a context associated with the user (e.g., when the task is requested such as a weekend or middle of the night, a place from which the request is made such as an IP address associated with a location across the world from where the user is normally situated, whether the type of information requested/accessed is a type of information not normally accessed by a user or a similarly situated user).

In some embodiments, the determination of whether the task is anomalous is made comprises determining a likelihood that that task/user activity corresponds to normal user activity and/or determining a likelihood that the task corresponds to abnormal user activity. In some embodiments, the user activity is deemed normal activity in response to a determination that the likelihood that task/user activity is within a threshold range associated with normal activity. In some embodiments, the user activity is deemed abnormal activity in response to a determination that the likelihood that task/user activity is not within a threshold range associated with normal activity. In some implementations, the threshold range associated with normal activity is set by the machine learning method (e.g., based on the training of the machine learning method). In some implementations, the threshold range associated with normal activity is set by an administrator (e.g., an administrator of a tenant) based on a risk threshold (e.g., an amount of risk that the tenant is willing to take in permitting user activity, a sensitivity of anomalous detection desired by the tenant, etc.). In some embodiments, the user activity is deemed abnormal activity in response to a determination that the likelihood that task/user activity is within a threshold range associated with abnormal activity. In some implementations, the threshold range associated with normal activity or the threshold range associated with abnormal activity is set by the machine learning method (e.g., based on the training of the machine learning method). In some implementations, the threshold range associated with normal activity or the threshold range associated with abnormal activity is set by an administrator (e.g., an administrator of a tenant) based on a risk threshold (e.g., an amount of risk that the tenant is willing to take in permitting user activity, a sensitivity of anomalous detection desired by the tenant, etc.).

In response to determining that the task is anomalous at 1040, process 1000 proceeds to 1050 at which an active measure is performed. Examples of the active measures includes notifying an administrative user, notifying one or more particular users associated with the tenant (e.g., a data privacy officer, a human resources representative, an executive, etc.), restricting access for the user for which anomalous behavior is detected (e.g., restricting execution of future queries or tasks with respect to the database system 125 such as at least until such restriction is released by an administrative user, etc.). In some embodiments, the one or more active measures are performed automatically in response to detection of the anomalous behavior. In some embodiments, a prompt is provided to an administrative user for activation of the one or more active measures. For example, the prompt includes a notification of the anomalous behavior, a recommendation of one or more active measures to be performed, and/or a selectable element to initiate an active measure. Process 1000 then proceeds to 1070.

In response to determining that the task is not anomalous at 1040, process 1000 proceeds to 1060 at which the task is executed. For example, in the case of the task being a query, the query is run against the corresponding one or more datasets. In some embodiments, in response to executing the task, a result of execution of the task is returned to the user that requested execution of the task. For example, the system causes a client terminal of the user (e.g., a user interface displayed on the client terminal, such as a page in a web browser) to display the result of execution of the task. As another example, the system generates a report comprising the result of execution of the task, and provides the report to the client terminal. Process 1000 then proceeds to 1070.

At 1070, the machine learning process is updated based at least in part on the request to execute the task. In some embodiments, the model associated with detecting anomalous user activity is updated based on the task or request to execute the task, and the determination of whether the task is anomalous. The model is continuously/dynamically updated as further user activity is monitored.

At 1080, a determination is made as to whether 1000 is complete. In some embodiments, process 1000 is determined to be complete in response to a determination that the user has indicated that no further queries or tasks are to be executed, the user has exited the system, an administrator indicates that process 1000 is to be paused or stopped, and/or anomalous behavior (e.g., anomalous user activity) is detected. In response to a determination that process 1000 is complete, process 1000 ends. In response to a determination that process 1000 is not complete, process 1000 returns to 1030.

Figure 11:
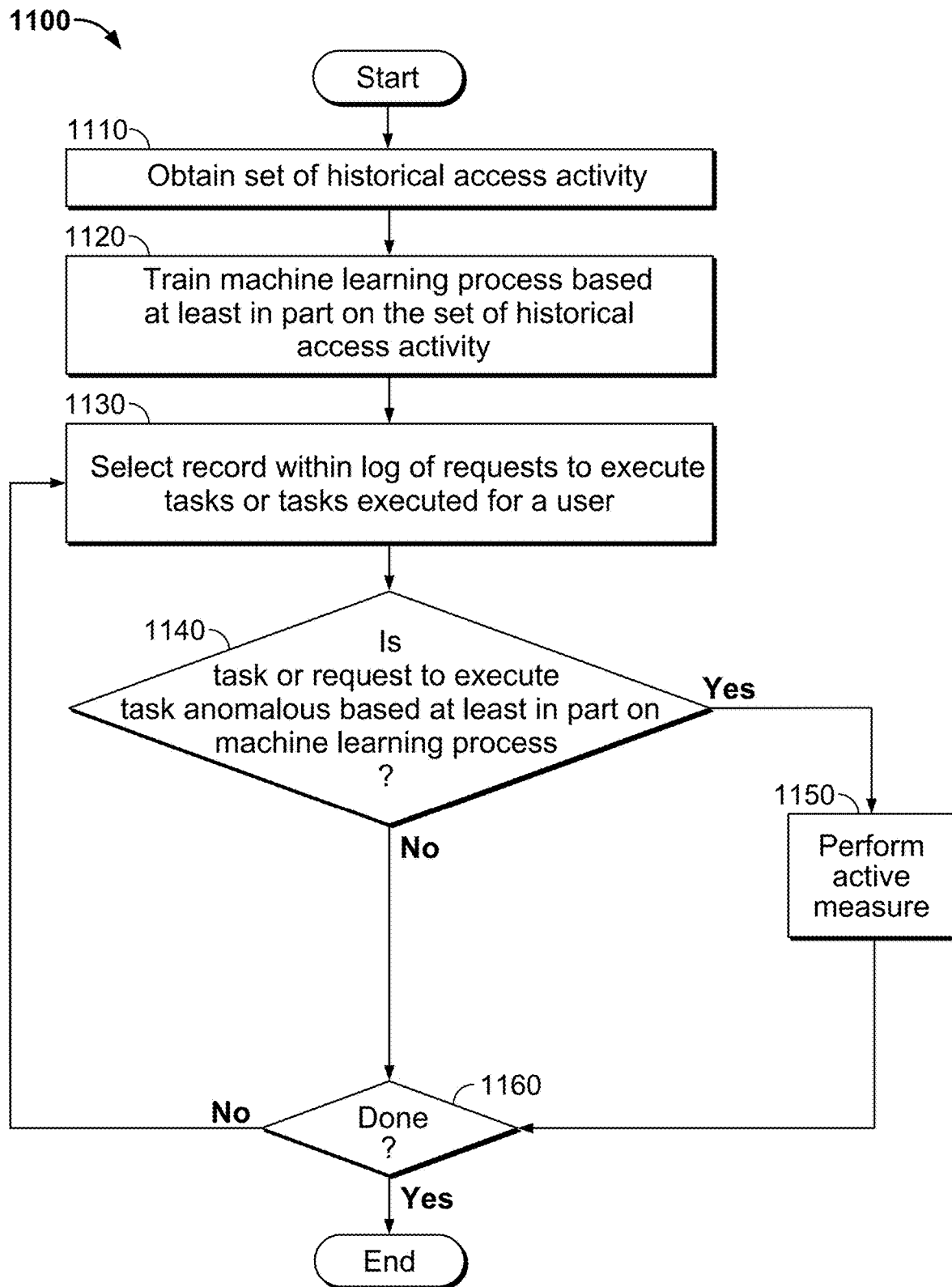
FIG. 11 is a flow diagram of a method for detecting anomalous user activity with respect to accessing a database system.

FIG. 11 is a flow diagram of a method for detecting anomalous user activity with respect to accessing a database system. According to various embodiments, a recording or logging of user activity is used in connection with detecting anomalous user activity.

At 1110, a set of historical access activity is obtained. In some embodiments, the set of historical access activity corresponds to activity with respect to one or more datasets for a particular tenant. In some embodiments, the set of historical access activity may correspond to activity across a plurality of tenants. The set of historical access activity comprises records of user activity (e.g., user queries, requests to execute tasks, type of information exposed to or accessed by a user, etc.). The set of historical activity comprises context data pertaining to a record (e.g., a location, time, date, role of the user, etc.).

At 1120, a machine learning process is trained based at least in part on the set of historical access activity. In some embodiments, the training of the machine learning process trains the machine learning process with respect to defining normal user activity with respect to a dataset (e.g., a dataset of a particular tenant, etc.). Alternatively or additionally, the training of the machine learning process trains the machine learning process with respect to defining abnormal or anomalous user activity with respect to a dataset. For example, a set of user activity predefined to correspond to an abnormal or anomalous are used to train the machine learning process to define abnormal or anomalous user activity.

At 1130, a record within the log is selected. In some embodiments, the log records information pertaining to user activity (e.g., user activity with respect to one or more datasets associated with a tenant). In some embodiments, the log pertaining to logged user activity comprises information indicating at least a subset of information or type of information that may have been exposed to a user in connection with that user executing a task with respect to the one or more datasets. As an example, the log comprises a record for user activity with respect to a task that may have exposed personally identifiable information or tenant sensitive information stored in the one or more datasets against which the task was executed. As an example, the log is searchable in connection with determining information or a type of information that may have been exposed to (e.g., returned to) the user with respect to an executed task.

According to various embodiments, the log comprises information pertaining to activity of a plurality of users with respect to one or more datasets associated with a tenant. In some embodiments, the log comprises records for all user activity (e.g., tasks executed) with respect to the one or more datasets associated with a tenant. According to various embodiments, a record comprised in the log is immutable.

At 1140, a determination is made of whether the task, or request to execute the task, corresponding to the selected record is anomalous. In some embodiments, the system determines whether the task, request to execute the task, corresponding to the selected record is anomalous based at least in part on the machine learning process. For example, the machine learning process is used to determine whether the task, or request to execute the task, is within the definition of normal user activity or whether the task is within the definition of abnormal user activity. The determination of whether the task is anomalous is based at least in part on the task, the user requesting the task, and a context associated with the user (e.g., when the task is requested such as a weekend or middle of the night, a place from which the request is made such as an IP address associated with a location across the world from where the user is normally situated, whether the type of information requested/accessed is a type of information not normally accessed by a user or a similarly situated user, whether the task or request to execute the task is comprised in a set or series of tasks that in combination correspond to an anomalous activity, etc.). As an example, anomalous activity corresponding to a set or series of tasks may include requesting a plurality of reports associated with tenant sensitive information within a predefined time period. As an example, anomalous activity corresponding to a set or series of tasks may include requesting a plurality of reports associated with tenant sensitive information within a predefined time period, with at least a subset of the requests to review the reports being followed by a corresponding downloading of the report to a client system from which the user is accessing the report. As an example, anomalous activity corresponding to a set or series of tasks may include requesting a plurality of reports associated with tenant sensitive information within a predefined time period, with at least a subset of the requests to review the reports being followed by a corresponding copy or clipping of information (e.g., capturing a screenshot, taking a snippet, etc.) of the report.

In some embodiments, the determination is made of whether the task is anomalous comprises determining a likelihood that that task/user activity corresponds to normal user activity and/or determining a likelihood that the task corresponds to abnormal user activity. In some embodiments, the user activity is deemed normal activity in response to a determination that the likelihood that task/user activity is within a threshold range associated with normal activity. In some embodiments, the user activity is deemed abnormal activity in response to a determination that the likelihood that task/user activity is not within a threshold range associated with normal activity. In some implementations, the threshold range associated with normal activity is set by the machine learning method (e.g., based on the training of the machine learning method). In some implementations, the threshold range associated with normal activity is set by an administrator (e.g., an administrator of a tenant) based on a risk threshold (e.g., an amount of risk that the tenant is willing to take in permitting user activity, a sensitivity of anomalous detection desired by the tenant, etc.). In some embodiments, the user activity is deemed abnormal activity in response to a determination that the likelihood that task/user activity is within a threshold range associated with abnormal activity. In some implementations, the threshold range associated with normal activity or the threshold range associated with abnormal activity is set by the machine learning method (e.g., based on the training of the machine learning method). In some implementations, the threshold range associated with normal activity or the threshold range associated with abnormal activity is set by an administrator (e.g., an administrator of a tenant) based on a risk threshold (e.g., an amount of risk that the tenant is willing to take in permitting user activity, a sensitivity of anomalous detection desired by the tenant, etc.).

In response to determining that the task is anomalous at 1140, process 1100 proceeds to 1150 at which an active measure is performed. Examples of the active measures includes notifying an administrative user, notifying one or more particular users associated with the tenant (e.g., a data privacy officer, a human resources representative, an executive, etc.), restricting access for the user for which anomalous behavior is detected (e.g., restricting execution of future queries or tasks with respect to the database system 125 such as at least until such restriction is released by an administrative user, etc.). In some embodiments, the one or more active measures are performed automatically in response to detection of the anomalous behavior. In some embodiments, a prompt is provided to an administrative user for activation of the one or more active measures. For example, the prompt includes a notification of the anomalous behavior, a recommendation of one or more active measures to be performed, and/or a selectable element to initiate an active measure. Process 1100 then proceeds to 1160.

In response to determining that the task is not anomalous at 1140, process 1100 proceeds to 1160.

At 1160, a determination is made as to whether 1100 is complete. In some embodiments, process 1100 is determined to be complete in response to a determination that an analysis of the log is complete, the user has exited the system, an administrator indicates that process 1000 is to be paused or stopped, and/or anomalous behavior (e.g., anomalous user activity) is detected. In response to a determination that process 1100 is complete, process 1100 ends. In response to a determination that process 1100 is not complete, process 1100 returns to 1130.

Various examples of embodiments described herein are described in connection with flow diagrams. Although the examples may include certain steps performed in a particular order, according to various embodiments, various steps may be performed in various orders and/or various steps may be combined into a single step or in parallel.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
one or more processors configured to:
receive a search request to search a log of user activity with respect to a database of a database system, wherein the log comprises a record of a request to execute a task with respect to the database, wherein the record comprises an indication of a user associated with the request and an information indication of one or more parts of a subset of a set of information of the database returned to the user in connection with executing the task, and wherein the task comprises obtaining a report including compensation information with respect to an employee of an organization associated with the database system;
determine one or more records responsive to the search request from the log; and
provide the one or more records responsive to the search request; and
one or more memories coupled to the one or more processors and configured to provide the one or more processors with instructions.

2. The system of claim 1, wherein the record further comprises one or more of a time or a date when the request to execute the task is received.

3. The system of claim 1, wherein the processor is further configured to determine whether an other user of the database system has permissions to view or use the log.

4. The system of claim 3, wherein the log is searchable by the other user based at least in part on a type of information that was returned with respect to the task for which the record is stored in the log.

5. The system of claim 3, wherein the log comprises a pointer that points to the subset of the set of information returned to the user in response to the request to execute the task with respect to the database.

6. The system of claim 3, wherein:
the log is searchable by the other user of the database system;
the log comprises a pointer that points to the subset of the set of information returned to the user in response to the request to execute the task with respect to the database; and
wherein the one or more processors are further configured to:
provide at least part of the log to the other user, the log being provided in a manner that provides a selectable link to at least part of the subset of the set of information to which the log points;
in response to receiving an input to select the selectable link, determine whether the other user is permitted to access link pointed to information to which the selectable link points; and
in response to a determination that the other user is permitted to access the linked pointed to information to which the selectable link points, provide to the other user the access link pointed to information to which the selectable link points.

7. The system of claim 3, wherein:
the log is searchable by another user of the database system, the other user having permissions to view or use the log; and the log is searchable based at least in part on an identifier of the user.

8. The system of claim 3, wherein:
the log is searchable by the other user of the database system, the other user having permissions to view or use the log; and
the log is searchable based at least in part on an identifier associated with the set of information returned with respect to the tasks for which the record is stored in the log.

9. The system of claim 3, wherein:
the log is searchable by the other user of the database system, the other user having permissions to view or use the log; and
the log is searchable based at least in part on a type of the set information returned to the user in response to the request to execute the task.

10. The system of claim 1, wherein the one or more processors are further configured to:
apply a machine learning process to analyze the log to detect an anomaly with respect to the search request; and
in response to detecting the anomaly, perform an active measure.

11. The system of claim 10, wherein the machine learning process is trained using historical information pertaining to a plurality of tasks with respect to the database requested by a plurality of users of the database system.

12. The system of claim 1, wherein the set of information comprises user or employee information pertaining to one or more users or employees of a tenant associated with the database system.

13. The system of claim 1, wherein the one or more processors are further configured to determine whether an other user of the database system has access permissions associated with a piece of information of the set of information.

14. The system of claim 13, wherein:
determining whether the other user of the database system has access permissions comprises determining an access permission associated with one or more of an object or an attribute of the object;
wherein the database is an object-oriented database; and
wherein the object is comprised in the object-oriented database.

15. The system of claim 1, wherein:
the request to execute the task is automatically initiated on behalf of the user in response to the system determining to provide to the user information responsive to the task; and
the system determines providing to the user information responsive to the task based at least in part on a context of the user, the system, or information responsive to the task.

16. A method, comprising:
receiving a search request to search a log of user activity with respect to a database of a database system, wherein the log comprises a record of a request to execute a task with respect to the database, wherein the record comprises an indication of a user associated with the request and an information indication of one or more parts of a subset of a set of information of the database returned to the user in connection with executing the task, and wherein the task comprises obtaining a report including compensation information with respect to an employee of an organization associated with the database system;
determining, using one or more processors, one or more records responsive to the search request from the log; and
providing the one or more records responsive to the search request.

17. A non-transitory computer program product storing computer instructions executed by a processor for:
receiving a search request to search a log of user activity with respect to a database of a database system, wherein the log comprises a record of a request to execute a task with respect to the database, wherein the record comprises an indication of a user associated with the request and an information indication of one or more parts of a subset of a set of information of the database returned to the user in connection with executing the task, and wherein the task comprises obtaining a report including compensation information with respect to an employee of an organization associated with the database system;
determining, using one or more processors, one or more records responsive to the search request from the log; and
providing the one or more records responsive to the search request.

* * * * *